US012015897B2

(12) United States Patent
Kim et al.

(10) Patent No.: US 12,015,897 B2
(45) Date of Patent: Jun. 18, 2024

(54) DISPLAY APPARATUS

(71) Applicant: LG Display Co., Ltd., Seoul (KR)

(72) Inventors: Kyounghwan Kim, Paju-si (KR); MinHo Sohn, Paju-si (KR); KiDuk Kim, Paju-si (KR); Sung-Jin Kang, Paju-si (KR); Jeonggoo Kang, Paju-si (KR); JaiHyuk Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/123,883

(22) Filed: Mar. 20, 2023

(65) Prior Publication Data

US 2023/0232163 A1 Jul. 20, 2023

Related U.S. Application Data

(63) Continuation of application No. 17/314,001, filed on May 6, 2021, now Pat. No. 11,647,336, which is a (Continued)

(30) Foreign Application Priority Data

Dec. 20, 2018 (KR) ........................ 10-2018-0166356

(51) Int. Cl.
*H04R 17/00* (2006.01)
*H04R 1/02* (2006.01)

(52) U.S. Cl.
CPC ............. *H04R 17/00* (2013.01); *H04R 1/028* (2013.01); *H04R 2499/11* (2013.01); *H04R 2499/15* (2013.01)

(58) Field of Classification Search
CPC .... H04R 17/00; H04R 1/028; H04R 2499/11; H04R 2499/15

(Continued)

(56) References Cited

U.S. PATENT DOCUMENTS 7,551,454 B2 6/2009 Wuchse et al.
8,069,543 B2 * 12/2011 Numata .................. H03H 9/21 29/25.35

(Continued)

FOREIGN PATENT DOCUMENTS

CN 103179236 A 6/2013
CN 108806556 A 11/2018

(Continued)

OTHER PUBLICATIONS

Office Action dated Jan. 11, 2023, issued in corresponding Korean Patent Application No. 10-2018-0166356.

(Continued)

*Primary Examiner* — Disler Paul
(74) *Attorney, Agent, or Firm* — Morgan, Lewis & Bockius LLP

(57) ABSTRACT

A display apparatus includes a display module including a display panel configured to display an image and a sound generating module on a rear surface of the display panel, the sound generating module includes a vibration generating device, a circuit board on a lower surface of the vibration generating device, a first adhesive member between the circuit board and the vibration generating device, and a second adhesive member between the vibration generating device and the display panel, an elastic modulus of the second adhesive member differing from an elastic modulus of the first adhesive member.

16 Claims, 18 Drawing Sheets

Related U.S. Application Data continuation of application No. 16/711,988, filed on Dec. 12, 2019, now Pat. No. 11,032,650.

(58) Field of Classification Search

USPC .................................................. 381/333, 388

See application file for complete search history.

(56) References Cited

U.S. PATENT DOCUMENTS

| | | | | |
|---|---|---|---|---|
| 9,351,080 | B2 | 5/2016 | Nabata et al. | |
| 9,838,781 | B2 * | 12/2017 | Behles | H04R 3/002 |
| 10,181,504 | B2 * | 1/2019 | Zhang | H10K 50/844 |
| 10,386,967 | B2 * | 8/2019 | Lee | H02J 50/10 |
| 10,484,796 | B2 * | 11/2019 | Ogata | H04R 31/00 |
| 10,595,109 | B2 * | 3/2020 | Shin | G06F 1/1626 |
| 10,698,243 | B2 | 6/2020 | Yoon et al. | |
| 10,847,585 | B2 | 11/2020 | Choi et al. | |
| 10,877,585 | B2 * | 12/2020 | Noh | G06F 3/165 |
| 11,064,276 | B2 * | 7/2021 | Ahn | H10K 50/841 |
| 11,245,095 | B2 * | 2/2022 | Kim | H10K 59/35 |
| 2010/0246863 | A1 | 9/2010 | Onishi et al. | |
| 2013/0156233 | A1 | 6/2013 | Joo | |
| 2014/0160040 | A1 | 6/2014 | Kang et al. | |
| 2015/0350775 | A1 | 12/2015 | Behles et al. | |
| 2017/0280246 | A1 | 9/2017 | Choi et al. | |
| 2017/0289694 | A1 | 10/2017 | Choi et al. | |
| 2018/0317000 | A1 | 11/2018 | Ham et al. | |
| 2018/0352314 | A1 | 12/2018 | Lee et al. | |
| 2019/0037164 | A1 | 1/2019 | Kim et al. | |
| 2020/0260614 | A1 | 8/2020 | Kim | |

FOREIGN PATENT DOCUMENTS

| | | | |
|---|---|---|---|
| JP | 2015-126605 | A | 7/2015 |
| KR | 10-1919454 | B1 | 11/2018 |
| KR | 10-2018-0131248 | A | 12/2018 |

OTHER PUBLICATIONS

Office Action dated Oct. 27, 2021, issued in corresponding Chinese Patent Application No. 201911182938.9.

* cited by examiner

DISPLAY APPARATUS

CROSS-REFERENCE TO RELATED APPLICATIONS

This application is a Continuation of U.S. patent application Ser. No. 17/314,001, filed on May 6, 2021, which is a Continuation of U.S. patent application Ser. No. 16/711,988, filed on Dec. 12, 2019, which claims the benefit and priority to Korean Patent Application No. 10-2018-0166356 filed on Dec. 20, 2018, the entireties of all of which are incorporated herein by reference.

BACKGROUND

Technical Field

The present disclosure relates to a display apparatus.

Discussion of the Related Art

Display apparatuses are equipped in home appliances or electronic apparatuses, such as televisions (TVs), monitors, notebook computers, smartphones, tablet computers, electronic organizers, electronic pads, wearable apparatuses, watch phones, portable information apparatuses, navigation apparatuses, and automotive control display apparatuses, and are used as a screen for displaying an image. Display apparatuses include a display panel for displaying an image and a sound device for outputting a sound associated with the image.

Recently, in display apparatuses, there is a trend of enlarging a screen, but the requirements for weight-lightening and slimming are increasing. However, since display apparatuses should include a sufficient space into which a sound device such as a speaker for outputting a sound is embedded, it is difficult to weight-lighten and slim. In a case where a sound device is configured with a piezoelectric member capable of being slimmed, the sound device is easily damaged by an external impact. Also, a sound generated by a sound device embedded into a display apparatus is output in a rearward direction or a sideward direction with respect to a body of the display apparatus, instead of a forward direction with respect to the display panel, and thus, does not travel toward a viewer (or a user) who is watching an image in front of the display apparatus, whereby immersion of the viewer watching the image is hindered.

SUMMARY

Accordingly, embodiments of the present disclosure are directed to providing a display apparatus that substantially obviates one or more issues due to limitations and disadvantages of the related art.

Therefore, the present inventors have recognized the above-described problems and have made various experiments so that when watching an image in front of a display panel, a traveling direction of a sound becomes a direction toward a front surface of the display panel, and durability against an external impact is enhanced. Through the various experiments, the present inventors have implemented a display apparatus having a new structure, which outputs a sound having a traveling direction toward a front surface of a display panel and is enhanced in durability against an external impact.

An aspect of the present disclosure is to provide a display apparatus which vibrates a display panel to output a sound to a forward region in front of the display panel and is enhanced in durability against an external impact.

Additional features and aspects will be set forth in the description that follows, and in part will be apparent from description or may be learned by practice of inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a display module including a display panel configured to display an image and a sound generating module on a rear surface of the display panel, wherein the sound generating module includes a vibration generating device, a circuit board on a lower surface of the vibration generating device, a first adhesive member between the circuit board and the vibration generating device, and a second adhesive member between the vibration generating device and the display panel, an elastic modulus of the second adhesive member differing from an elastic modulus of the first adhesive member.

In another aspect, a display apparatus comprises a display module including a display panel configured to display an image and a sound generating module on a rear surface of the display panel, wherein the sound generating module includes a vibration generating device, a circuit board on a lower surface of the vibration generating device, a first adhesive member and a third adhesive member between the circuit board and the vibration generating device, and a member between the first adhesive member and the third adhesive member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure, illustrate embodiments of the disclosure and together with the description serve to explain various principles of the disclosure.

Figure 1:
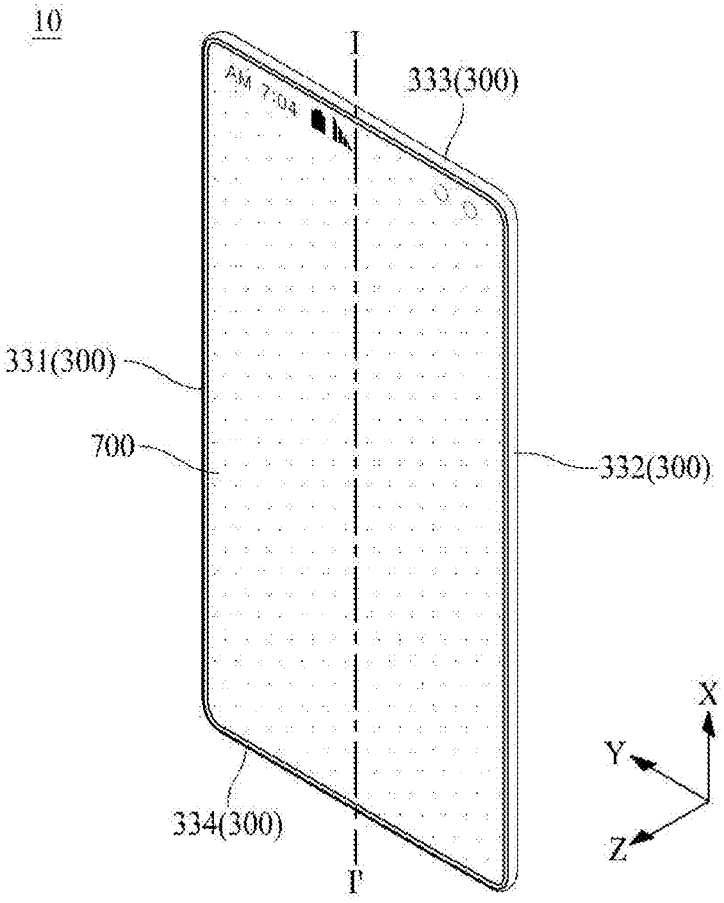
FIG. 1 is a perspective view illustrating a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to the embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. In the following description, when the detailed description of the relevant known function or configuration is determined to unnecessarily obscure the important point of the present disclosure, the detailed description of such known function or configuration may be omitted. When terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship when a position relation between two parts is described as "on," "over," "under," and "next," one or more other parts may be disposed between the two parts unless a more limiting term, such as "just" or "direct(ly)" is used.

In describing a time relationship, for example, when the temporal order is described as "after," "subsequent," "next," and "before," a case which is not continuous may be included unless a more limiting term, such as "just" "immediate(ly)," or "direct(ly)" is used.

It will be understood that, although the terms "first," "second," may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as "first," "second," "A," "B," "(a)," "(b), may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed items. For example, the meaning of "at least one of a first item, a second item, and a third element" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatuses for vehicles, or a mobile electronic apparatus such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set apparatus which is a final consumer apparatus or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to the present embodiment may use any type of display panel, such as a liquid crystal display panel, an organic light emitting diode (OLED) display panel, and an electroluminescent display panel, but is not limited to a specific display panel which is vibrated by a sound generation device according to an embodiment of the present disclosure to output a sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, embodiments are not limited to the metal plate, and the display panel may include another structure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described in detail with reference to the accompanying drawings.

Figure 2:
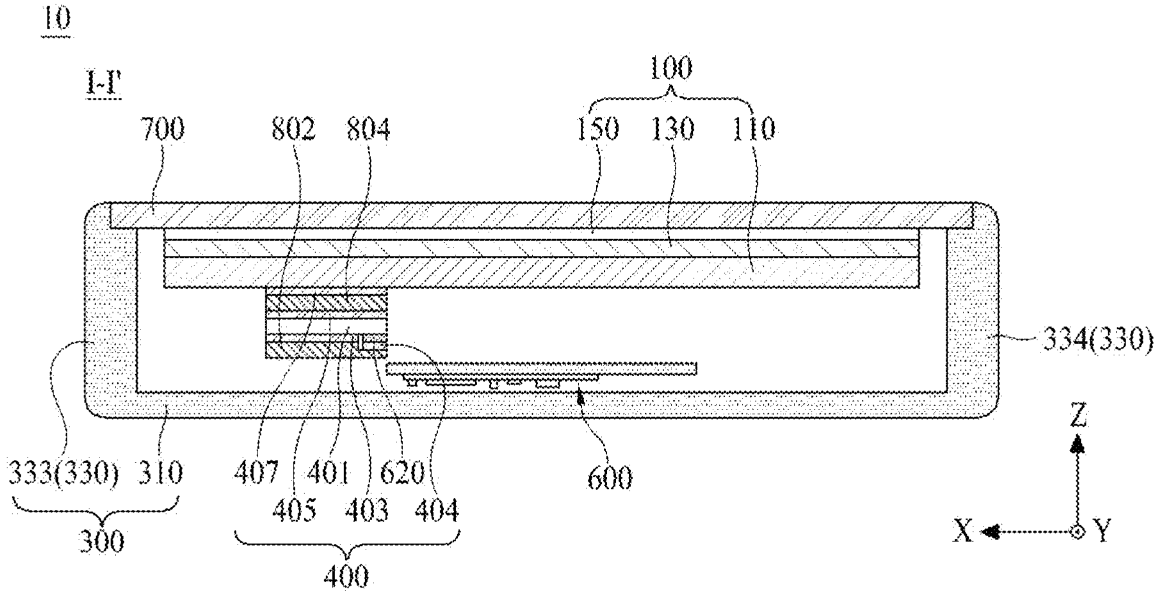
FIG. 2 is a cross-sectional view taken along line I-I' illustrated in FIG. 1.

FIG. 1 is a perspective view illustrating a display apparatus according to an embodiment of the present disclosure. FIG. 2 is a cross-sectional view taken along line I-I' illustrated in FIG. 1.

With reference to FIGS. 1 and 2, the display apparatus 10 according to an embodiment of the present disclosure may include a display module 100, a supporting member 300, and a sound generating module 400.

The display module 100 may include a display panel 110. The display panel 110 may display an image, for example, an electronic image or a digital image, and may be implemented as any type of display panel, such as a liquid crystal display panel, an organic light emitting diode (OLED) display panel, an electroluminescent display panel, etc. The display panel 110 may vibrate based on a vibration of the sound generating module 400 to output sound in a forward direction with respect to the display panel 110.

For example, the display panel 110 may be a light emitting display panel or a flexible light emitting display panel, but is not limited thereto. The display panel 110 may include a pixel array substrate including a pixel array layer including a plurality of pixels and an encapsulation layer that encapsulates the pixel array layer.

For example, the display panel 110 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed. In the bottom emission type, the visible light emitted from the pixel array layer may be irradiated onto a rearward region behind the base substrate to allow an image to be displayed. In the dual emission type, the visible light emitted from the pixel array layer may be emitted to a forward region and a rearward region with respect to the base substrate.

The plurality of pixels may be respectively in a plurality of pixel areas defined by a plurality of pixel driving lines. Also, each of the plurality of pixels may include a pixel circuit, including at least two thin film transistors (TFTs) and at least one capacitor, and a light emitting device that emits light with a current supplied from the pixel circuit, but is not limited thereto. For example, the light emitting device may include an organic light emitting layer or a quantum dot light emitting layer, but is not limited thereto. As another example, the light emitting device may include a micro light emitting diode (LED), but is not limited thereto.

The encapsulation layer may protect the TFTs and the light emitting device from an external impact and may prevent water or moisture from penetrating into the light emitting device. The encapsulation layer may be replaced with an encapsulation substrate which is attached on the pixel array substrate by a filler surrounding the pixel array. If the filler is a transparent filler, the encapsulation substrate may be a transparent encapsulation substrate.

The display module 100 according to an embodiment of the present disclosure may further include a touch panel 130. The touch panel 130 may include a touch electrode layer that is provided on the display panel 110, and includes a touch electrode for sensing a user touch applied to the display module 100. The touch electrode layer may sense a capacitance variation of the touch electrode caused by the user touch. For example, a mutual capacitance type where a plurality of touch driving electrodes and a plurality of touch sensing electrodes are provided to intersect one another or a self-capacitance type where only a plurality of touch sensing electrodes are provided may be applied, and an adhesive layer may be provided on an upper surface or a lower surface and may be attached on and fixed to an upper element or a lower element.

The display module 100 may further include a polarizing film 150 on the touch panel 130. The polarizing film 150 may be attached on an upper surface of the touch panel 130 by a film attachment member. The polarizing film 150 may circularly polarize external light reflected by the TFT and/or the pixel driving lines provided on the pixel array substrate, thereby enhancing the visibility and contrast ratio of the display panel 110. The polarizing film 150 may be between the encapsulation layer of the display panel 110 and the touch panel 130.

The display panel 100 may further include a barrier layer between the encapsulation layer of the display panel 110 and the touch panel 130. The barrier layer may prevent water or moisture and the like from penetrating into the pixel array.

The display module 100 may further include a color filter layer on an upper surface of the encapsulation layer of the display panel 110. The color filter layer may include a color filter which is provided to overlap each of the plurality of pixels and transmits only a wavelength of a color set in each of the plurality of pixels.

The supporting member 300 may accommodate the display module 100. In the present disclosure, the supporting member 300 may be referred to as a “cover bottom,” a “plate bottom,” a “back cover,” a “base frame,” a “metal frame,” a “metal chassis,” a “chassis base,” or an “m-chassis.” Therefore, the supporting member 300 may be a supporter for supporting the display panel 110 and may be implemented as any type of a frame or a plate structure each on the rear surface of the display apparatus.

For example, the supporting member 300 may support a rear surface and a side surface of the display panel. For example, the supporting member 300 may include a supporting member rear part 310 and a supporting member side part 330. The supporting member rear part 310 may be on a rear surface of the display module 100, and may cover the rear surface of the display module 100. For example, the supporting member rear part 310 may cover a circuit accommodating space in the rear surface of the display module 100. For example, the supporting member rear part 310 may be formed of the same material as that of a cover window 700, or may be formed of a glass material differing from that of the cover window 700. For example, the supporting member rear part 310 may be a rear cover, but the term is not limited thereto. For example, the supporting member rear part 310 may be provided independently from the supporting member side part 330.

The supporting member side part 330 may surround each of side surfaces of the display module 100 to have a display accommodating space into which the display module 100 is accommodated. The supporting member side part 330 may have a frame shape or a corner-rounded shape, but is not limited thereto. For example, each of side surfaces of the supporting member 300 may be rounded to have a curvature radius, for enhancing a sense of beauty in design of the display apparatus.

The supporting member side part 330 may include first to fourth side surfaces 331 to 334 of the supporting member 300. The first to fourth side surfaces 331 to 334 of the supporting member 300 may provide an accommodating space for accommodating the display module 100. For example, the first to fourth side surfaces 331 to 334 of the supporting member 300 may provide a circuit accommodating space for accommodating peripheral circuits of an electronic apparatus including a battery and a circuit configuration of a driving circuit and the like.

The first side surface 331 of the supporting member 300 may be disposed in parallel with a first lengthwise direction X of the display apparatus. For example, the first side surface 331 of the supporting member 300 may be disposed vertical to a first side surface or a first long side of the supporting member rear part 310. The first side surface 331 of the supporting member 300 may surround the first side surface or one short side of the display module 100.

The second side surface 332 of the supporting member 300 may be disposed in parallel with the first side surface 331 of the supporting member 300. For example, the second side surface 332 of the supporting member 300 may be disposed vertical to a second side surface or a second long side of the supporting member rear part 310. The second side surface 332 of the supporting member 300 may surround the second side surface or the other short side of the display module 100.

The third side surface 333 of the supporting member 300 may be disposed in parallel with a second lengthwise direction Y of the display apparatus intersecting or perpendicular to the first lengthwise direction X of the display apparatus. For example, the third side surface 333 of the supporting member 300 may be disposed vertical to a third side surface or a first short side of the supporting member rear part 310. The third side surface 333 of the supporting member 300 may surround the third side surface or one long side of the display module 100.

The fourth side surface 334 of the supporting member 300 may be disposed in parallel with the third side surface 333 of the supporting member 300. For example, the fourth side surface 334 of the supporting member 300 may be disposed vertical to a fourth side surface or a second short side of the supporting member rear part 310. The fourth side surface 334 of the supporting member 300 may surround the fourth side surface or the other long side of the display module 100.

The supporting member 300 according to an embodiment of the present disclosure may further include a vibration device exposure part in the third side surface 333 of the supporting member 300. For example, the vibration device exposure part may protrude from the third side surface 333 of the supporting member 300 and may be near the sound generating module 400. Therefore, the sound generating module 400 attached to the rear surface of the display module 100 may be exposed at the outside through the vibration device exposure part. Also, a portion of a lower portion of the sound generating module 400 may be inserted into the vibration device exposure part. The vibration device exposure part may secure a vibration space for a vibration of the sound generating module 400 disposed in the display module 100, and thus, the display apparatus may be slimmed and the sound generating module 400 may be easily placed. When a distance between the supporting member rear part 310 and the rear surface of the display module 100 is greater than the vibration space, the vibration device exposure part may be omitted.

The display apparatus 10 according to an embodiment of the present disclosure may further include a driving circuit 600 and a cover window 700.

The driving circuit 600 may be in a circuit accommodating space in the support member 300, and may be connected to the display panel 110 and the sound generating module 400. The driving circuit 600 may include a panel driving circuit and a sound processing circuit.

The panel driving circuit may be mounted on the display panel 110 or the circuit board to display an image on the display panel 110. The panel driving circuit may be connected to a pad part on the pixel array substrate of the display panel 110 and supply a driving signal and a data signal to the pixel driving lines, thereby displaying an image on each pixel.

The sound processing circuit may generate an audio signal based on an audio source and amplify the audio signal to generate a vibration driving signal. A vibration generating device 401 of the sound generating module 400 may vibrate based on the generated vibration driving signal.

The cover window 700 may be coupled or connected to the supporting member 300 to support the display module 100. The cover window 700 may be formed of glass or a reinforced glass material. For example, the cover window 700 may have either a sapphire glass or a Gorilla glass or a stacked structure thereof. The cover window 700 may be attached to the front surface of the display module 100 via an adhesive member. The adhesive member may be, but is not limited to, an optically clear adhesive (OCA), an optically clear resin (OCR), or a pressure sensitive adhesive (PSA).

In one embodiment, the cover window 700 may cover a non-display area, except a display area, of the display module 100. In another embodiment, the cover window 700 may include a transparent area overlapping the display area of the display module 100, a light blocking area overlapping the non-display area of the display module 100, and a design layer provided in the light blocking area to cover the non-display area of the display module 100. The cover window 700 may be a support member, a window cover, or the like, and is not limited thereto.

The sound generating module 400 may be on the rear surface of the display module 100 (for example, the rear surface of the display panel 110). The sound generating module 400 may include the vibration generating device 401. For example, the vibration generating device 401 may be on the rear surface of the display panel 110. The sound generating module 400 may vibrate the display module 100 based on the vibration driving signal applied to the vibration generating device 401. Therefore, the sound generating module 400 may output sound in a forward direction Z with respect to the display panel 110 based on a vibration of the display panel 110. The vibration generating device 401 may generate a sound using the display panel 110 as a vibration plate. For example, the vibration generating device 401 may directly vibrate the display panel 100 to generate sound. The vibration generating device 401 may be referred to as an "actuator," an "exciter," or a "transducer," but is not limited thereto. For example, the sound generating device 401 may be a sound device for outputting sound according to an electrical signal.

The vibration generating device 401 may include a piezoelectric material layer having a piezoelectric effect and an electrode at the piezoelectric material layer. The vibration generating device 401 may include the piezoelectric material layer, and thus, may be referred to as a "piezoelectric device."

The piezoelectric material layer may include a piezoelectric material which vibrates with an electric field. Here, the piezoelectric material may have a characteristic in which as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage.

The vibration generating device 401 may include a polymer material-containing piezoelectric material, a thin film material-having piezoelectric material, a composite material-having piezoelectric material, or a single crystalline ceramic or polycrystalline ceramic-having piezoelectric material. Examples of the polymer material-having piezoelectric material may include poly vinylidene fluoride (PVDF), polyvinylidene fluoride trifluoroethylene P(VDF-TrFe), and P(VDFTeFE). Examples of the thin film material-containing piezoelectric material may include ZnO, CdS, and AN. Examples of the composite material-having piezoelectric material may include PZT-PVDF, PZT-silicon rubber, PZT-epoxy, PZT-foam polymer, and PZT-foam urethane. Examples of the single crystalline ceramic-having piezoelectric material may include $\alpha$-$AlPO_4$, $\alpha$-$SiO_2$, $LiNbO_3$, $Tb_2(MoO_4)_3$, $Li_2B_4O_7$, and ZnO. Examples of the polycrystalline ceramic-having piezoelectric material may include a PZT-based material, a PT-based material, a PZT-complex Perovskite-based material, and $BaTiO_3$.

The vibration generating device 401 may have a shape such as a rectangular (e.g. quadrilateral) shape, a quadrate shape, a lozenge shape, or a parallelogram shape, but a shape is not limited thereto.

The sound generating module 400 may further include a reinforcement member. The reinforcement member may be further on an upper surface and/or a lower surface of the vibration generating device 401, and thus, the vibration generating device 401 may be reduced or prevented from being detached or broken by an external impact. The reinforcement member may include a first reinforcement member 802 and a second reinforcement member 804. The first reinforcement member 802 and the second reinforcement member 804 may be respectively on the upper surface and the lower surface of the vibration generating device 401. Therefore, the vibration generating device 401 may be reduced or prevented from being detached or broken by an external impact. For example, the first reinforcement member 802 may be on the lower surface of the vibration generating device 401, and the second reinforcement member 804 may be on the upper surface of the vibration generating device 401.

The vibration generating device 401 may be coupled or connected to the reinforcement member by an adhesive member. For example, the vibration generating device 401 may be coupled or connected to the first reinforcement member 802 by a first adhesive member 403. For example, the vibration generating device 401 may be coupled or connected to the second reinforcement member 804 by a second adhesive member 405. The second reinforcement member 804 may be disposed on or coupled or connected to the rear surface of the display panel 110 by a third adhesive member 407.

A circuit board 620 connected to the driving circuit 600 may be on the lower surface of the vibration generating device 401. The driving circuit 600 may apply the vibration driving signal to the circuit board 620, and thus, a signal may be applied to the vibration generating device 401. A fourth adhesive member 404 may be disposed on a lower surface of the circuit board 620.

When the reinforcement member is at the vibration generating device 401, durability against an external impact may be enhanced, but a strain energy density based on a thickness or a height of the sound generating device 400 may vary. This will be described below with reference to FIG. 3.

Figure 3:
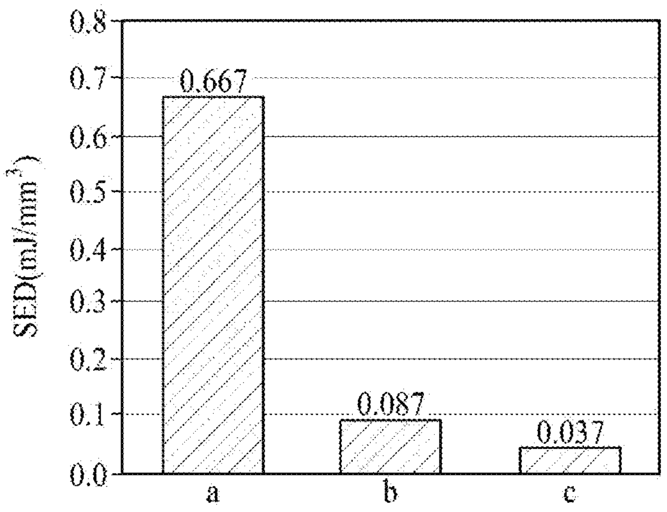
FIG. 3 illustrates a simulation result of a strain energy density in a sound generating module according to an embodiment of the present disclosure.

FIG. 3 illustrates a simulation result of a strain energy density in a sound generating module according to an embodiment of the present disclosure.

In FIG. 3, a strain energy density (SED) ($mJ/mm^3$) represents a relationship between stress and a strain rate. It is shown that, as the strain energy density becomes lower, an impact resistance against an external impact becomes stronger. Here, "a" represents that only a vibration generating device is provided, "b" represents that the display apparatus of FIG. 2 is implemented, and "c" represents that a reinforcement member is provided on an upper surface or a lower surface of a vibration generating device without an adhesive member in FIG. 2. With reference to FIG. 3, it may be seen that a strain energy density of a where only a vibration generating device is provided is 0.667 $mJ/mm^3$, a strain energy density of b where an adhesive member and a reinforcement member are provided is 0.087 $mJ/mm^3$, and a strain energy density of c where a reinforcement member is provided without an adhesive member is 0.037 $mJ/mm^3$. It may be seen that a strain energy density is lower in a case, where an adhesive member and a reinforcement member are provided, than a case where only a vibration generating device is provided. It may be seen that a strain energy density of when a reinforcement member is provided without an adhesive member is almost similar to a strain energy density of when an adhesive member and a reinforcement member are provided. Accordingly, when an adhesive member and a reinforcement member are provided, it may be seen that an impact resistance against an external impact is enhanced.

Figure 4A:
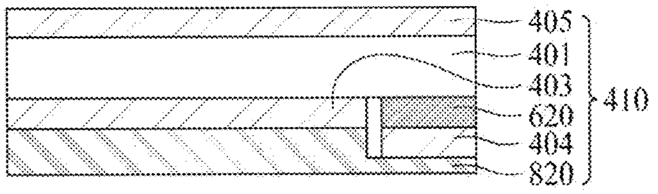
FIGS. 4A and 4B are diagrams illustrating a sound generating module according to an embodiment of the present disclosure.
Figure 4B:
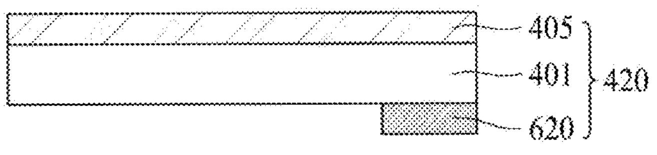

FIGS. 4A and 4B illustrate a sound generating module according to an embodiment of the present disclosure.

FIGS. 4A and 4B illustrate another embodiment of a sound generating module for decreasing a height of the sound generating module to enhance a sound pressure level of the sound generating module. With reference to FIG. 4A, a sound generating module 410 according to an embodiment of the present disclosure may include a vibration generating device 401, a first reinforcement member 802 on a lower surface of the vibration generating device 401, and a circuit board 620. An adhesive member may be on each of an upper surface and a lower surface of the vibration generating device 401. For example, the sound generating module 410 may include a first adhesive member 403 on the lower surface of the vibration generating device 401 and a second adhesive member 405 on the upper surface of the vibration generating device 401. A fourth adhesive member 404 may be on a lower surface of the circuit board 620.

With reference to FIG. 4B, a sound generating module 420 according to an embodiment of the present disclosure may include a vibration generating device 401, a second adhesive member 405 on an upper surface of the vibration generating device 401, and a circuit board 620 on a lower surface of the vibration generating device 401.

Figure 5:
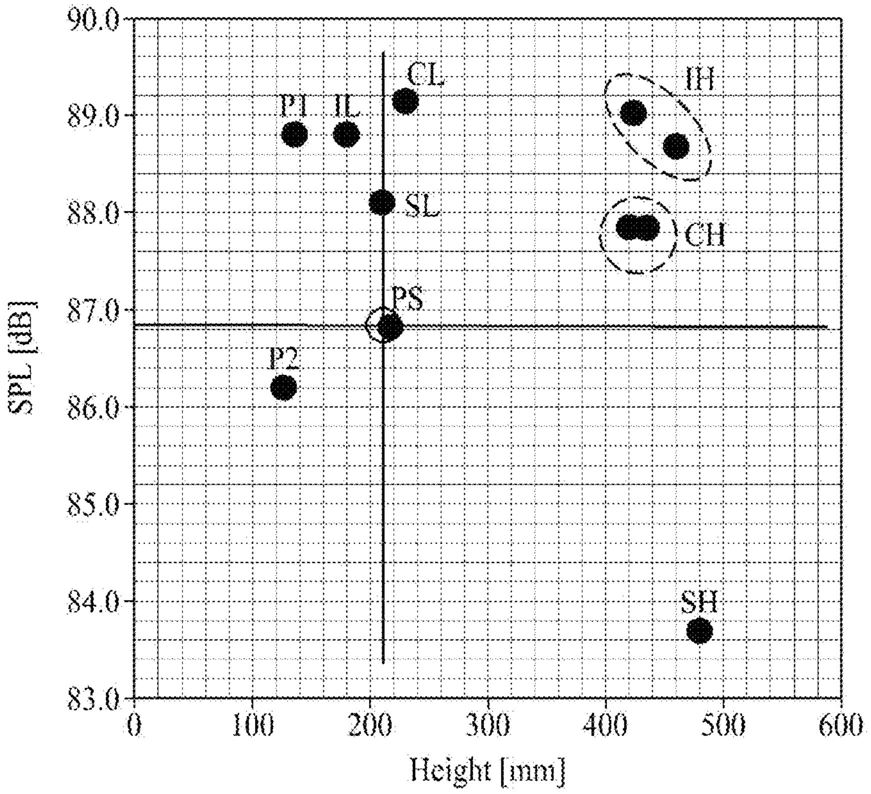
FIG. 5 is a diagram illustrating a height and a sound pressure level in an impact test process performed on a sound generating module according to an embodiment of the present disclosure.

FIG. 5 illustrates a height and a sound pressure level in an impact test process performed on a sound generating module according to an embodiment of the present disclosure.

In FIG. 5, the abscissa axis (x-axis) represents an impact test height (mm), and the ordinate axis (y-axis) represents a sound pressure level (SPL) in decibel (dB).

An external impact test performed on a display apparatus may use, for example, a ball drop test. The ball drop test may be a test where a sound generating module impacted and a display panel including the same are fixed to a drop position, and by increasing a distance by 1 cm each time in a vertical direction to allow an iron bead having a weight of 100 g or 1,000 g to freely fall, the display performance of an impacted display panel is compared with the performance of the sound generating module before a driving test and the performance of the sound generating module after the driving test. In a case which desires to check a quantitative control issue and a secondary collision issue in association with free fall with respect to a finished (or final product) display apparatus to which a display panel and a sound generating module are applied, a free falling impact test with reliability added thereto may be used. The free falling impact test may be a test where, in a state where a finished display apparatus is applied, a falling target is transported by a certain height (for example, 1 m or more) and is freely fallen on a falling floor surface, and by using various sensors, a degree of damage of a freely fallen target is determined. However, embodiments are not limited thereto, and another method may be used as an impact test performed on a display panel and a sound generating module.

With reference to FIG. 5, PS represents the sound generating module of FIG. 2, each of SL, IL, CL, SH, CH, and IH represents the sound generating module of FIG. 4A, and each of P1 and P2 represents the sound generating module of FIG. 4B. PS and P2 represent an example where a widthwise length of a vibration generating device is set to be longer than a lengthwise length thereof. P1, SH, CL, SL, IH, and CH represent an example where a widthwise length of a vibration generating device is set to be equal to a lengthwise length thereof. Each of PS, SH, CL, SL, IH, and CH represents a result obtained by measuring an external impact and a sound pressure level based on a material of a reinforcement member and a material of an adhesive member. In IH and CH each representing a result obtained by testing two sound generating modules, a test result is illustrated as two, and each of two test results is illustrated as a dotted-line circle. PS represents an example where a reinforcement member is formed of stainless steel and an adhesive member having a low elastic modulus is provided. SL represents an example where a reinforcement member is formed of stainless steel and an adhesive member having a low elastic modulus is provided. IL represents an example where a reinforcement member is formed of polyimide and an adhesive member having a low elastic modulus is provided. CL represents an example where a reinforcement member is formed of polycarbonate and an adhesive member having a low elastic modulus is provided. SH represents an example where a reinforcement member is formed of stainless steel and an adhesive member having a high elastic modulus is provided. CH represents an example where a reinforcement member is formed of polycarbonate and an adhesive member having a high elastic modulus is provided. IH represents an example where a reinforcement member is formed of polyimide and an adhesive member having a high elastic modulus is provided.

With reference to FIG. 5, it may be seen that a sound pressure level varies with respect to a size of a vibration generating device. For example, it may be seen that a sound pressure level is higher in P1 than P2. Accordingly, it may be seen that a sound pressure level of a vibration generating device where a widthwise length is the same as a lengthwise length is higher than that of a vibration generating device where a widthwise length is longer than a lengthwise length.

In FIG. 5, it is shown that, as an impact test height increases, an impact resistance against an external impact increases. An impact resistance may vary based on whether a reinforcement member is provided. For example, it may be seen that an impact resistance is enhanced two to five times more in PS, SL, IL, CL, SH, IH, and CH, where a reinforcement member is provided, than P1 and P2 where a reinforcement member is not provided.

For example, when an adhesive member having a lower elastic modulus is applied, a sound pressure level may vary based on the number of reinforcement members and materials of the reinforcement members. For example, it may be seen that a sound pressure level is lower in PS, where two reinforcement members are provided, than SL, IL, and CL where one reinforcement member is provided. It may be seen that a sound pressure level of IL where a reinforcement member is formed of polyimide and a sound pressure level of CL where a reinforcement member is formed of polycarbonate are higher than that of SL where a reinforcement member is formed of stainless steel. It may be seen that a sound pressure level of CL where a reinforcement member is formed of polycarbonate is higher than that of IL where a reinforcement member is formed of polyimide.

For example, when an adhesive member having a high elastic modulus is applied, a sound pressure level may vary based on a material of the reinforcement member. For example, it may be seen that a sound pressure level of IH where a reinforcement member is formed of polyimide and a sound pressure level of CH where a reinforcement member is formed of polycarbonate are higher than that of SH where a reinforcement member is formed of stainless steel. It may be seen that a sound pressure level of IH where a reinforcement member is formed of polyimide is higher than that of CH where a reinforcement member is formed of polycarbonate.

For example, it is shown that an impact resistance varies based on a material of an adhesive member. For example, it may be seen that an impact resistance of each of SH, CH, and IH where an adhesive member having a high elastic modulus is provided is 2 to 2.5 times higher than that of each of PS, IL, SL, and CL where an adhesive member having a low elastic modulus is provided.

Therefore, when a reinforcement member is provided and an adhesive member having a high elastic modulus is provided, it may be seen that a sound pressure level and an impact resistance are enhanced. For example, in a case where a reinforcement member is formed of polyimide and an adhesive member having a high elastic modulus is provided, it may be seen that an impact resistance against an external impact is enhanced and a sound pressure level is enhanced.

Figure 6:
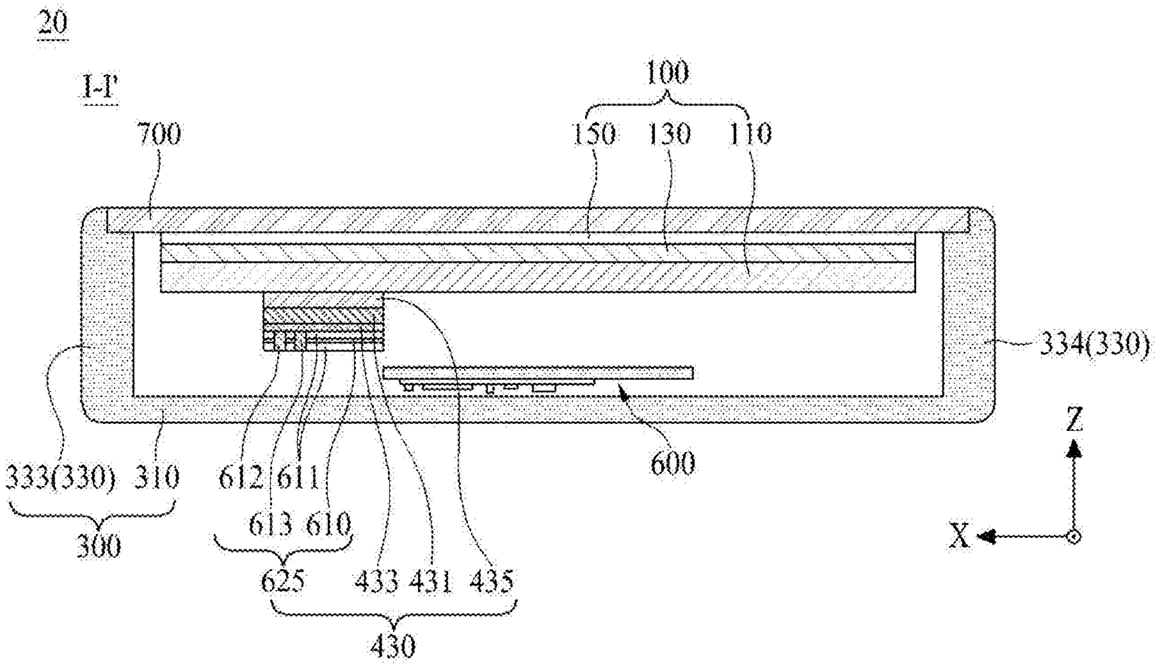
FIG. 6 is a cross-sectional view taken along line I-I' illustrated in FIG. 1 according to another embodiment of the present disclosure.

FIG. 6 is a cross-sectional view taken along line I-I' illustrated in FIG. 1 according to another embodiment of the present disclosure.

With reference to FIG. 6, a display apparatus 20 according to an embodiment of the present disclosure may include a display module 100, a supporting member 300, and a sound generating module 430. The display module 100 may include a display panel 110. The display module 100, the display panel 110, and the supporting member 300 are as described above with reference to FIGS. 1 and 2, and thus, their descriptions are omitted or will be briefly given below.

As described above with reference to FIGS. 4A, 4B, and 5, when a reinforcement member is provided, an impact resistance may be enhanced, but a height of a sound generating module may increase, causing a problem where a sound pressure level is reduced and a thickness of the sound generating module is thickened. Also, since an adhesive for attaching a circuit board penetrates into an adhesive member, the present inventors have recognized that an adhesive surface between a reinforcement member and the adhesive member is not uniform, and due to this, the reinforcement member on a lower surface of a vibration generating device may be partially detached. Therefore, the inventors have performed various experiments for implementing a sound generating module where a thickness thereof does not increase, an impact resistance is enhanced, and a problem caused by a reinforcement member does not occur. Through the various experiments, the present inventors have invented a sound generating module having a new structure, in which a thickness of a sound generating module does not increase, an impact resistance is enhanced, and a defect caused by the partial detachment of a reinforcement member does not occur.

As described above with reference to FIGS. 4A, 4B, and 5, when a reinforcement member is formed of polyimide, it may be seen that an impact resistance against an external impact is enhanced. Therefore, the inventors have performed various experiments for applying polyimide to a reinforcement member. This will be described below.

With reference to FIG. 6, a sound generating module 430 according to an embodiment of the present disclosure may include a vibration generating device 431 and a circuit board 625 on a lower surface of the vibration generating device 431. Through various experiments, the present inventors have recognized that a circuit board is formed of polyimide and the polyimide may be applied to form a reinforcement member, without any increase in thickness of a sound generating module. For example, the circuit board 625 may be a flexible printed circuit board (FPCB), but is not limited thereto. For example, the circuit board 625 may be formed of polyimide. The circuit board 625 may have the same size as that of the vibration generating device 401 and may be implemented as a reinforcement member. When the circuit board 625 may have the same size as that of the vibration generating device 401, the circuit board 625 may be easily disposed in process compared to FIG. 2. Therefore, since a circuit board configures a reinforcement member, a thickness of a sound generating module may not increase, and an impact resistance against an external impact may be enhanced.

The vibration generating device 431 may be disposed on or coupled or connected to the circuit board 625 and the display panel 110 by an adhesive member. For example, the vibration generating device 431 may be disposed on or coupled or connected to the circuit board 625 by a first adhesive member 433. For example, the vibration generating device 431 may be disposed on or coupled or connected to the display panel 110 by a second adhesive member 435. An elastic modulus (or a young's modulus) of the first adhesive member 433 may differ from that of the second adhesive member 435. For example, the elastic modulus of the first adhesive member 433 may be higher than that of the second adhesive member 435. For example, the elastic modulus of the first adhesive member 433 may be 1 GPa to 200 GPa. For example, an elastic modulus of the second adhesive member 435 may be 0.1 MPa to 30 MPa. For example, the second adhesive member 435 adjacent to the display panel 110 may be formed of a material having an elastic modulus which is lower than that of the first adhesive member 433, so as not to affect a sound pressure level corresponding to a low frequency when the sound generating module 430 vibrates. For example, the first adhesive member 433 may be formed of adhesive resin, but is not limited thereto. For example, the first adhesive member 433 may be configured as an adhesive member having conductivity. For example, the first adhesive member 433 may include a thermocurable material including a conductive filler, but is not limited thereto. For example, the first adhesive member 433 may include a thermocurable acrylic material including a conductive filler, but is not limited thereto. The circuit board 625 may be disposed on or coupled or connected to the vibration generating device 431 by the first adhesive member 433. Therefore, an adhesive member on at least one electrode and an adhesive member for coupling or connecting a circuit board to a vibration generating device may be provided as one adhesive member, and thus, a manufacturing process may be simplified. For example, the second adhesive member 435 may include a sticking agent or an adhesive each including at least one of a double-sided tape, acrylic resin, epoxy-based resin, silicon-based resin, polyurethane-based resin, and polyvinyl alcohol-based resin, but is not limited thereto. The vibration generating device 431 may be disposed on or coupled or connected to the display panel 110 by the second adhesive member 435. The first adhesive member 433 and the second adhesive member 435 may each be a sticking member or a sticking agent, but the term is not limited thereto. Therefore, since a reinforcement member is provided and an adhesive member having a high elastic modulus is provided, an impact resistance against an external impact may be enhanced, and a sound pressure level may be enhanced.

The circuit board 625 may be on a lower surface of the vibration generating device 431. The circuit board 625 may include a base film 610, a first electrode 612, a second electrode 613, and a passivation layer 611. The base film 610 may be on the lower surface of the vibration generating device 431. The base film 610 may be formed of a polyimide-based material. The first electrode 612 and the second electrode 613 may be on the lower surface of the vibration generating device 431. For example, the first electrode 612 and the second electrode 613 may be on an upper surface and a lower surface of the base film 610. The first electrode 612 may be an electrode for applying a signal to the vibration generating device 431 and may be a VDD electrode or a common electrode. The second electrode 613 may be a ground electrode. The first electrode 612 and the second electrode 613 may be formed of an opaque metal material which has relatively low resistance and has good heat dissipation characteristic. However, embodiments are not limited thereto. For example, the first electrode 612 and the second electrode 613 may be formed of a transparent conductive material or a conductive polymer material. The passivation layer 611 may be disposed for protecting a line between the first electrode 612 and the second electrode 613. For example, the passivation layer 611 may be in a region except the first electrode 612 and the second electrode 613, but is not limited thereto. For example, the passivation layer 611 may be on each of the upper surface and the lower surface of the base film 610. For example, the first electrode 612 and the second electrode 613 may be spaced apart from each other on the lower surface of the vibration generating device 431, and the base film 610 and the passivation layer 611 may be between the first electrode 612 and the second electrode 613. The passivation layer 611 may be configured as a type where a sticking agent or an adhesive is coated or formed on a polyimide-based film, but is not limited thereto. For example, the sticking agent or the adhesive may include at least one of a cyanoacrylate adhesive, an epoxy-based adhesive, an acrylate adhesive, and an acrylic adhesive, but is not limited thereto.

Figure 7:
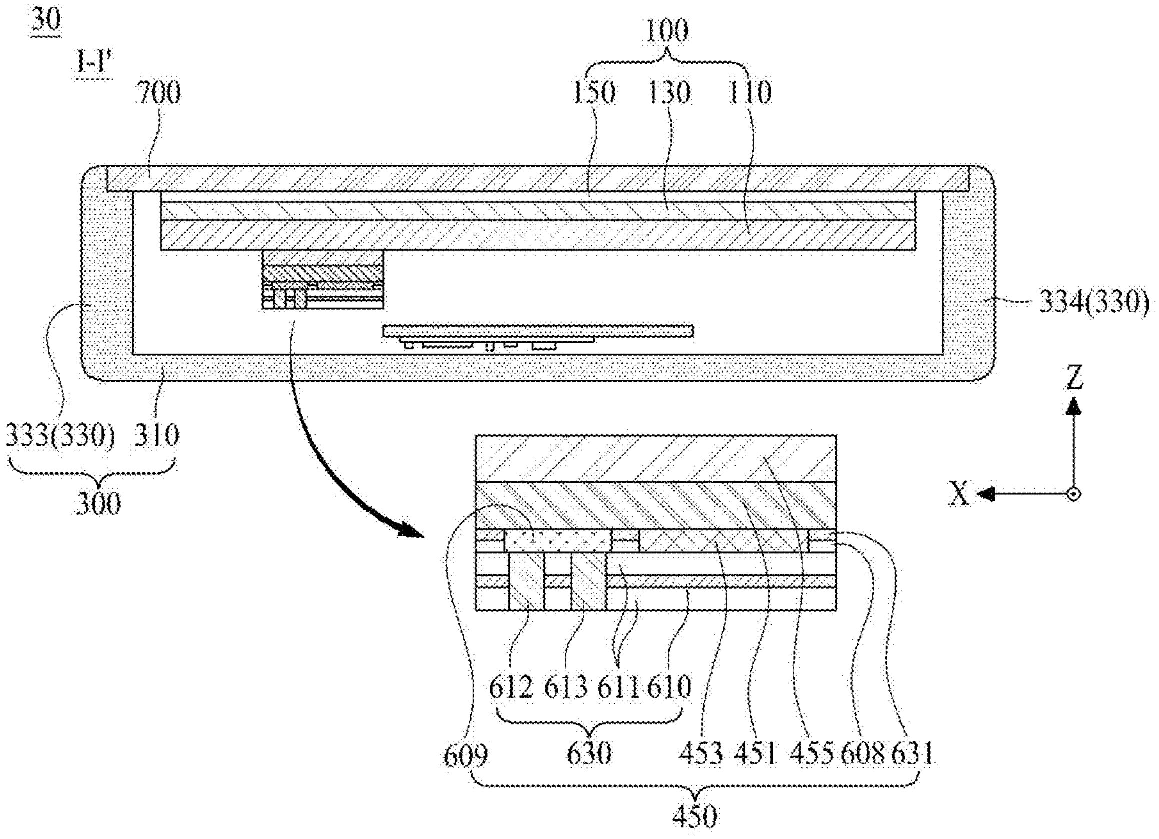
FIG. 7 is a cross-sectional view taken along line I-I' illustrated in FIG. 1 according to another embodiment of the present disclosure.

FIG. 7 is a cross-sectional view taken along line I-I' illustrated in FIG. 1 according to another embodiment of the present disclosure.

With reference to FIG. 7, a display apparatus 30 according to an embodiment of the present disclosure may include a display module 100, a supporting member 300, and a sound generating module 450. The display module 100 may include a display panel 110. The display module 100, the display panel 110, and the supporting member 300 are as described above with reference to FIGS. 1 and 2, and thus, their descriptions are omitted or will be briefly given below.

A sound generating module 450 according to an embodiment of the present disclosure may include a vibration generating device 451 and a circuit board 630 on a lower surface of the vibration generating device 451. The vibration generating device 451 may be disposed on or coupled or connected to the circuit board 630 and the display panel 110 by an adhesive member. For example, the vibration generating device 451 may be disposed on or coupled or connected to the circuit board 630 by a first adhesive member 453. For example, the vibration generating device 451 may be disposed on or coupled or connected to the display panel 110 by a second adhesive member 455. An elastic modulus (or a young's modulus) of the first adhesive member 453 may differ from that of the second adhesive member 455. For example, the elastic modulus of the first adhesive member 453 may be higher than that of the second adhesive member 455. For example, the elastic modulus of the first adhesive member 453 may be 1 GPa to 200 GPa. For example, an elastic modulus of the second adhesive member 455 may be 0.1 MPa to 30 MPa. For example, the second adhesive member 455 adjacent to the display panel 110 may be formed of a material having an elastic modulus which is lower than that of the first adhesive member 453, so as not to affect a sound pressure level corresponding to a low frequency when the sound generating module 450 vibrates. For example, the first adhesive member 453 may include a sticking agent or an adhesive each including at least one of a cyanoacrylate adhesive, an epoxy-based adhesive, an acrylate adhesive, and an acrylic adhesive, but is not limited thereto. For example, the second adhesive member 455 may include a sticking agent or an adhesive each including at least one of a double-sided tape, acrylic resin, epoxy-based resin, silicon-based resin, polyurethane-based resin, and polyvinyl alcohol-based resin, but is not limited thereto. The first adhesive member 453 and the second adhesive member 455 may each be a sticking member or a sticking agent, but the term is not limited thereto. Therefore, since a reinforcement member is provided and an adhesive member having a high elastic modulus is provided, an impact resistance against an external impact may be enhanced, and a sound pressure level may be enhanced.

The circuit board 630 may be on a lower surface of the vibration generating device 451. The circuit board 630 may include a base film 610, a first electrode 612, a second electrode 613, and a passivation layer 611. The base film 610 may be on the lower surface of the vibration generating device 451. The base film 610 may be formed of a polyimide-based material. The first electrode 612 and the second electrode 613 may be on the lower surface of the vibration generating device 451. For example, the first electrode 612 and the second electrode 613 may be on an upper surface and a lower surface of the base film 610. The first electrode 612 may be an electrode for applying a signal to the vibration generating device 451 and may be a VDD electrode or a common electrode. The second electrode 613 may be a ground electrode. The first electrode 612 and the second electrode 613 may be formed of an opaque metal material which has relatively low resistance and has good heat dissipation characteristic. However, embodiments are not limited thereto, and the first electrode 612 and the second electrode 613 may be formed of a transparent conductive material or a conductive polymer material. The passivation layer 611 may be disposed for protecting a line between the first electrode 612 and the second electrode 613. For example, the passivation layer 611 may be disposed in a region except the first electrode 612 and the second electrode 613, but is not limited thereto. For example, the passivation layer 611 may be on each of the upper surface and the lower surface of the base film 610. For example, the first electrode 612 and the second electrode 613 may be spaced apart from each other on the lower surface of the vibration generating device 431, and the base film 610 and the passivation layer 611 may be between the first electrode 612 and the second electrode 613. The passivation layer 611 may be configured as a type where a sticking agent or an adhesive is coated on a polyimide-based film, but is not limited thereto. For example, the sticking agent or the adhesive may include at least one of a cyanoacrylate adhesive, an epoxy-based adhesive, an acrylate adhesive, and an acrylic adhesive, but is not limited thereto.

A fifth adhesive member 609 may be on the first electrode 612 and the second electrode 613. For example, the first electrode 612 and the second electrode 613 may be attached to the lower surface of the vibration generating device 451 by the fifth adhesive member 609. The passivation layer 611 may be attached to the lower surface of the vibration generating device 451 by each of the first adhesive member 453 and the fifth adhesive member 609. For example, the fifth adhesive member 609 may be formed of a material differing from that of the first adhesive member 453. For example, the fifth adhesive member 609 may be formed of a conductive adhesive. For example, the conductive adhesive may include thermocurable (e.g., thermosetting) resin including a conductive filler or a thermocurable polymer including a conductive filler, but is not limited thereto. For example, the first adhesive member 453 may be formed of a material having a high elastic modulus. An adhesive may be attached to the circuit board 630. The circuit board 630 may be attached to the display panel through a compression process and a curing process in a case which attaches the circuit board 630 to the display panel, and in the compression process and the curing process, the adhesive of the circuit board 630 may flow out to the outside. A member 631 may be further provided between the first adhesive member 453 and the fifth adhesive member 609, for reducing or preventing a defect such as the partial detachment of the circuit board 630 caused by the adhesive. Therefore, the member 631 may separate the first adhesive member 453 from the fifth adhesive member 609. For example, the member 631 may be formed of a polyimide-based material or a polycarbonate-based material, but is not limited thereto. Accordingly, since the member 631 is provided between the first adhesive member 453 and the fifth adhesive member 609, the adhesive of the circuit board 630 may be reduced or prevented from flowing out to the outside in the compression process and the curing process. Therefore, an adhesive surface between the circuit board 630 and the first adhesive member 453 may be uniform, and thus, a defect such as the partial detachment of the circuit board 630 may be prevented.

A sixth adhesive member 608 may be between the circuit board 630 and the member 631. For example, the sixth adhesive member 608 may be between the base film 610 and the member 631. The member 631 may be disposed on or coupled or connected to the circuit board 630 by the sixth adhesive member 608. The sixth adhesive member 608 may be formed of an acrylic material or an epoxy-based material, but is not limited thereto.

Figure 8A:
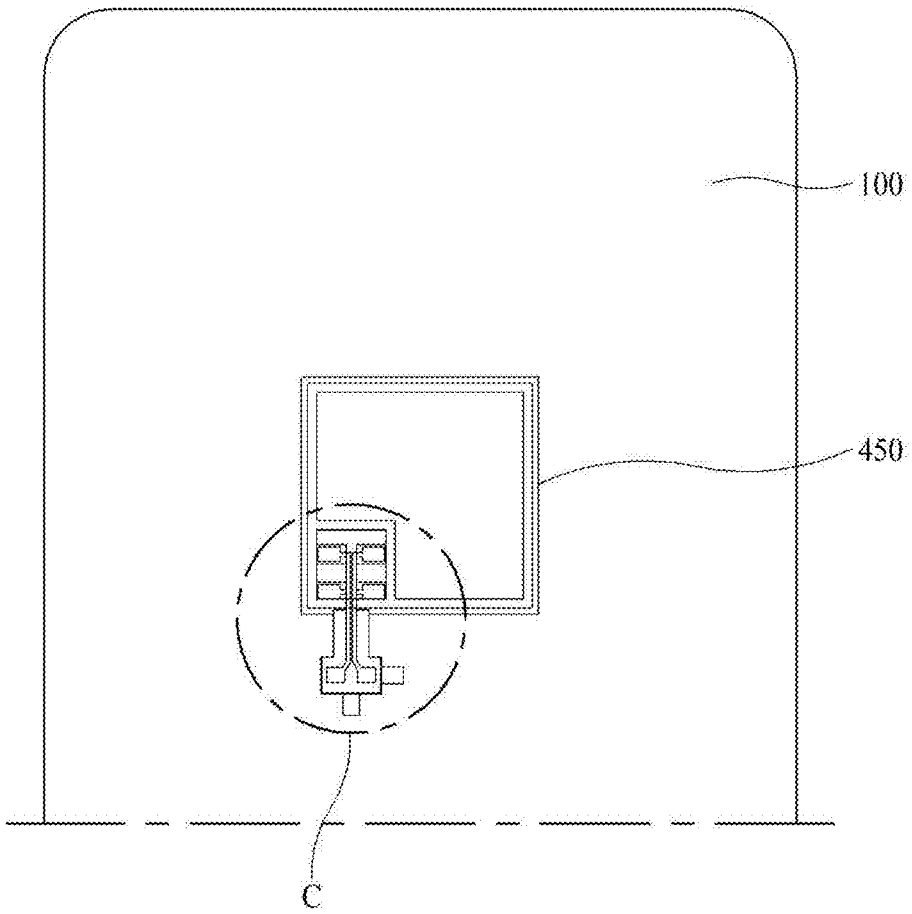
FIGS. 8A to 8C are detailed views of FIG. 7 according to another embodiment of the present disclosure.
Figure 8B:
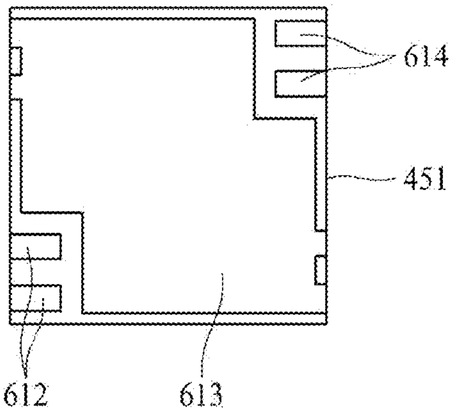
Figure 8C:
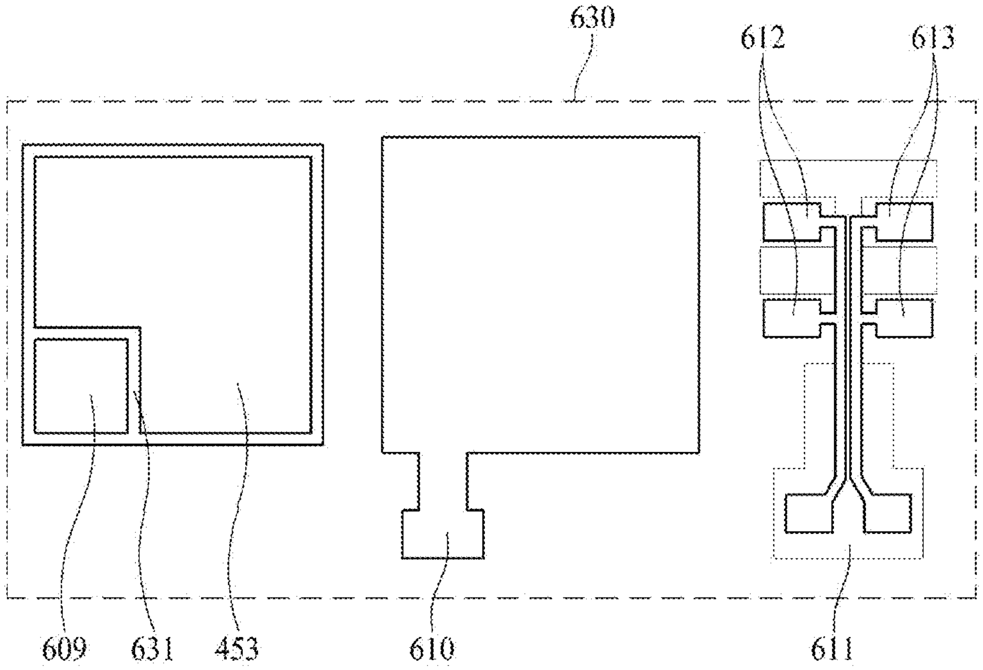

FIGS. 8A to 8C are detailed views of FIG. 7 according to another embodiment of the present disclosure.

With reference to FIGS. 8A to 8C, a sound generating module 450 may be on a lower surface of the display module 100. A first electrode 612 and a second electrode 613 may be disposed at a vibration generating device 451. For example, the first electrode 612 and the second electrode 613 may be on a lower surface of the vibration generating device 451. The first electrode 612 may be a VDD electrode or a common electrode, and the second electrode 613 may be a ground electrode. When the first electrode 612 is disconnected, the third electrode 614 may be an auxiliary electrode and may be a VDD electrode.

With reference to FIG. 8C, in a circuit board 630, a first adhesive member 453 and a fifth adhesive member 609 may be on a base film 610. A member 631 may be between the first adhesive member 453 and the fifth adhesive member 609. A right portion of FIG. 8C illustrates a "C" portion of FIG. 8A. For example, the first electrode 612, the second electrode 613, and a passivation layer 611 are illustrated. The passivation layer 611 may be provided for protecting a line between the first electrode 612 and the second electrode 613. For example, the passivation layer 611 may be in a region except the first electrode 612 and the second electrode 613, but is not limited thereto. FIGS. 8A to 8C may be identically applied to the sound generating module of FIG. 6. For example, elements other than the fifth adhesive member 609, the member 631, and the sixth adhesive member 608 may be identically applied.

Figure 9:
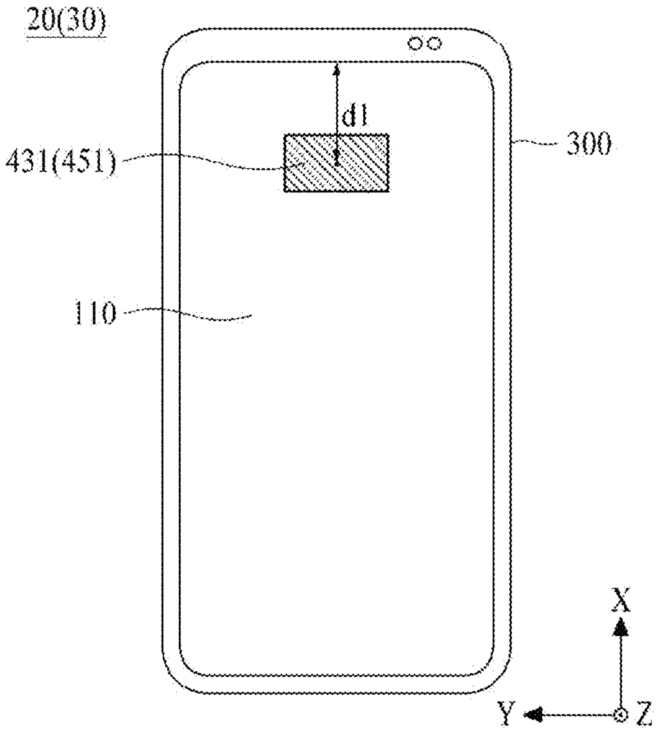
FIG. 9 is a rear view of a display apparatus according to another embodiment of the present disclosure.

FIG. 9 is a rear view of a display apparatus according to another embodiment of the present disclosure.

With reference to FIG. 9, each of a plurality of sound generating modules 430 and 450 may be on an upper side of a rear surface of a display panel 110. The display panel 110 may include a first short side, a second short side facing the first short side, and a long side vertical to the first short side or the second short side. For example, the first short side and the second short side may be in a widthwise direction of the display panel 110, and the long side may be in a lengthwise direction of the display panel 110. The widthwise direction and the lengthwise direction may be interchangeable. For example, a distance d1 between a center of each of a plurality of vibration generating devices 431 and 451 and the first short side of the display panel 110 may be ¼ to ⅓ of the long side of the display panel 110. When the sound generating modules 430 or 450 are on the upper portion of the rear surface of the display panel 110, a sound pressure level may be more improved than when the sound generating modules 430 or 450 are disposed at a center of the display panel 110.

Figure 10:
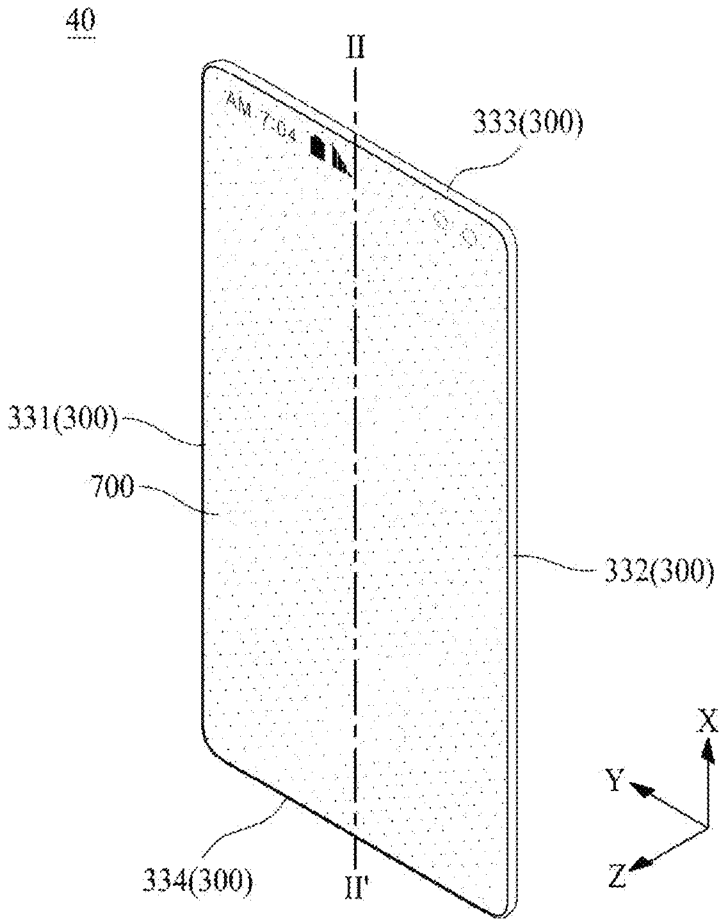
FIG. 10 is a perspective view illustrating a display apparatus according to another embodiment of the present disclosure.
Figure 11:
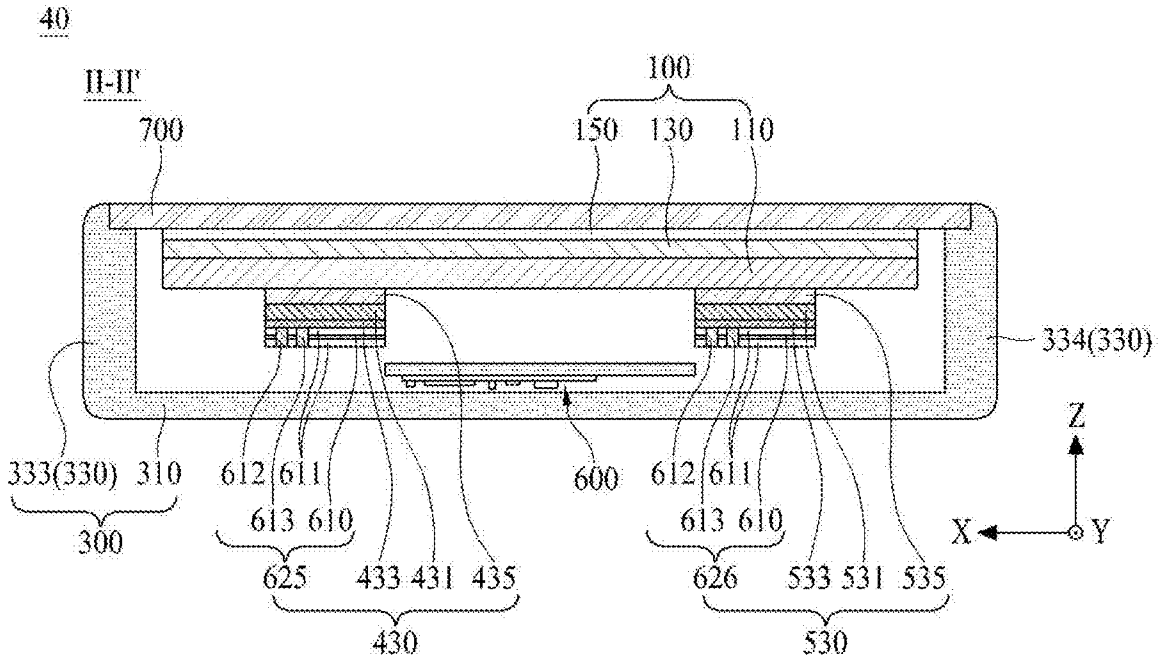
FIG. 11 is a cross-sectional view taken along line II-IF illustrated in FIG. 10.

FIG. 10 is a perspective view illustrating a display apparatus according to another embodiment of the present disclosure. FIG. 11 is a cross-sectional view taken along line II-II' illustrated in FIG. 10.

With reference to FIGS. 10 and 11, a display apparatus 40 according to an embodiment of the present disclosure may include a display module 100, a supporting member 300, a first sound generating module 430, and a second sound generating module 530. The display module 100 may include a display panel 110. The display module 100, the display panel 110, and the supporting member 300 are as described above with reference to FIGS. 1 and 2, and thus, their descriptions are omitted or will be briefly given below.

With reference to FIGS. 10 and 11, the display apparatus 40 according to an embodiment of the present disclosure may include the first sound generating module 430 and the second sound generating module 530. A sound generating module, a vibration generating device, and a circuit board each described above with reference to FIG. 6 may respectively be a first sound generating module, a first vibration generating device, and a first circuit board each illustrated in FIGS. 10 to 11.

The first sound generating module 430 according to an embodiment of the present disclosure may include a first vibration generating device 431 and a first circuit board 625 on a lower surface of the first vibration generating device 431.

The first vibration generating device 431 may be disposed on or coupled or connected to the first circuit board 625 and the display panel 110 by an adhesive member. For example, the first vibration generating device 431 may be disposed on or coupled or connected to the first circuit board 625 by a first adhesive member 433. For example, the first vibration generating device 431 may be disposed on or coupled or connected to the display panel 110 by a second adhesive member 435. An elastic modulus of the first adhesive member 433 may differ from that of the second adhesive member 435. For example, the second adhesive member 435 adjacent to the display panel 110 may be formed of a material having an elastic modulus which is lower than that of the first adhesive member 433, so as not to affect a sound pressure level corresponding to a low frequency when the first sound generating module 430 vibrates. For example, the first adhesive member 433 and the second adhesive member 435 may each include a sticking member or a sticking agent, but the term is not limited thereto. For example, a middle-pitched sound band may be 200 Hz to 3 kHz, a high-pitched sound band may be 3 kHz or more, and a low-pitched sound band may be 200 Hz or less. However, the present embodiment is not limited thereto.

The second sound generating module 530 according to an embodiment of the present disclosure may include a second vibration generating device 531 and a second circuit board 626 on a lower surface of the second vibration generating device 531.

The second vibration generating device 531 may be disposed on or coupled or connected to the second circuit board 626 and the display panel 110 by an adhesive member. For example, the second vibration generating device 531 may be disposed on or coupled or connected to the second circuit board 626 by a third adhesive member 533. For example, the second vibration generating device 531 may be disposed on or coupled or connected to the display panel 110 by a fourth adhesive member 535. An elastic modulus of the third adhesive member 533 may differ from that of the fourth adhesive member 535. For example, the elastic modulus of the third adhesive member 533 may be higher than that of the fourth adhesive member 535. For example, the elastic modulus of the third adhesive member 533 may be 1 GPa to 200 GPa. For example, an elastic modulus of the fourth adhesive member 535 may be 0.1 MPa to 30 MPa. For example, the fourth adhesive member 535 adjacent to the display panel 110 may be formed of a material having an elastic modulus which is lower than that of the third adhesive member 533, so as not to affect a sound pressure level corresponding to a low frequency when the second sound generating module 530 vibrates. For example, the third adhesive member 533 may be formed of adhesive resin, but is not limited thereto. For example, the third adhesive member 533 may be configured as an adhesive member having conductivity. For example, the third adhesive member 533 may include a thermocurable material including a conductive filler, but is not limited thereto. For example, the third adhesive member 533 may include a thermocurable acrylic material including a conductive filler, but is not limited thereto. The second circuit board 626 may be disposed on or coupled or connected to the second vibration generating device 531 by the third adhesive member 533. Therefore, an adhesive member disposed on at least one electrode and an adhesive member for coupling a circuit board to a vibration generating device may be provided as one adhesive member, and thus, a manufacturing process may be simplified.

For example, the fourth adhesive member 535 may include a sticking agent or an adhesive each including at least one of a double-sided tape, acrylic resin, epoxy-based resin, silicon-based resin, polyurethane-based resin, and polyvinyl alcohol-based resin, but is not limited thereto. The third adhesive member 533 and the fourth adhesive member 535 may each be a sticking member or a sticking agent, but the term is not limited thereto. Therefore, since a reinforcement member is provided and an adhesive member having a high elastic modulus is provided, an impact resistance against an external impact may be enhanced, and a sound pressure level may be enhanced.

The first circuit board 625 may be on a lower surface of the first vibration generating device 431. The first circuit board 625 may include a base film 610, a first electrode 612, a second electrode 613, and a passivation layer 611. The first circuit board 625 has been described above with reference to FIG. 6, and thus, its detailed description is omitted and a second circuit board will be described below. The second circuit board 626 may be on a lower surface of the second vibration generating device 531. The second circuit board 626 may include a base film 610, a first electrode 612, a second electrode 613, and a passivation layer 611. The base film 610 may be on a lower surface of the second vibration generating device 531. The base film 610 may be formed of a polyimide-based material. The first electrode 612 and the second electrode 613 may be on the lower surface of the second vibration generating device 531. For example, the first electrode 612 and the second electrode 613 may be on an upper surface and a lower surface of the base film 610. The first electrode 612 may be an electrode for applying a signal to the second vibration generating device 531 and may be a VDD electrode or a common electrode. The second electrode 613 may be a ground electrode. The first electrode 612 and the second electrode 613 may be formed of an opaque metal material which has relatively low resistance and has good heat dissipation characteristic. However, embodiments are not limited thereto. For example, the first electrode 612 and the second electrode 613 may be formed of a transparent conductive material or a conductive polymer material. The passivation layer 611 may be disposed for protecting a line between the first electrode 612 and the second electrode 613. For example, the passivation layer 611 may be in a region except the first electrode 612 and the second electrode 613, but is not limited thereto. For example, the passivation layer 611 may be on each of the upper surface and the lower surface of the base film 610. For example, the passivation layer 611 may be configured as a type where a sticking agent or an adhesive is coated on a polyimide-based film, but is not limited thereto. For example, the sticking agent or the adhesive may include at least one of a cyanoacrylate adhesive, an epoxy-based adhesive, an acrylate adhesive, and an acrylic adhesive, but is not limited thereto.

Figure 12:
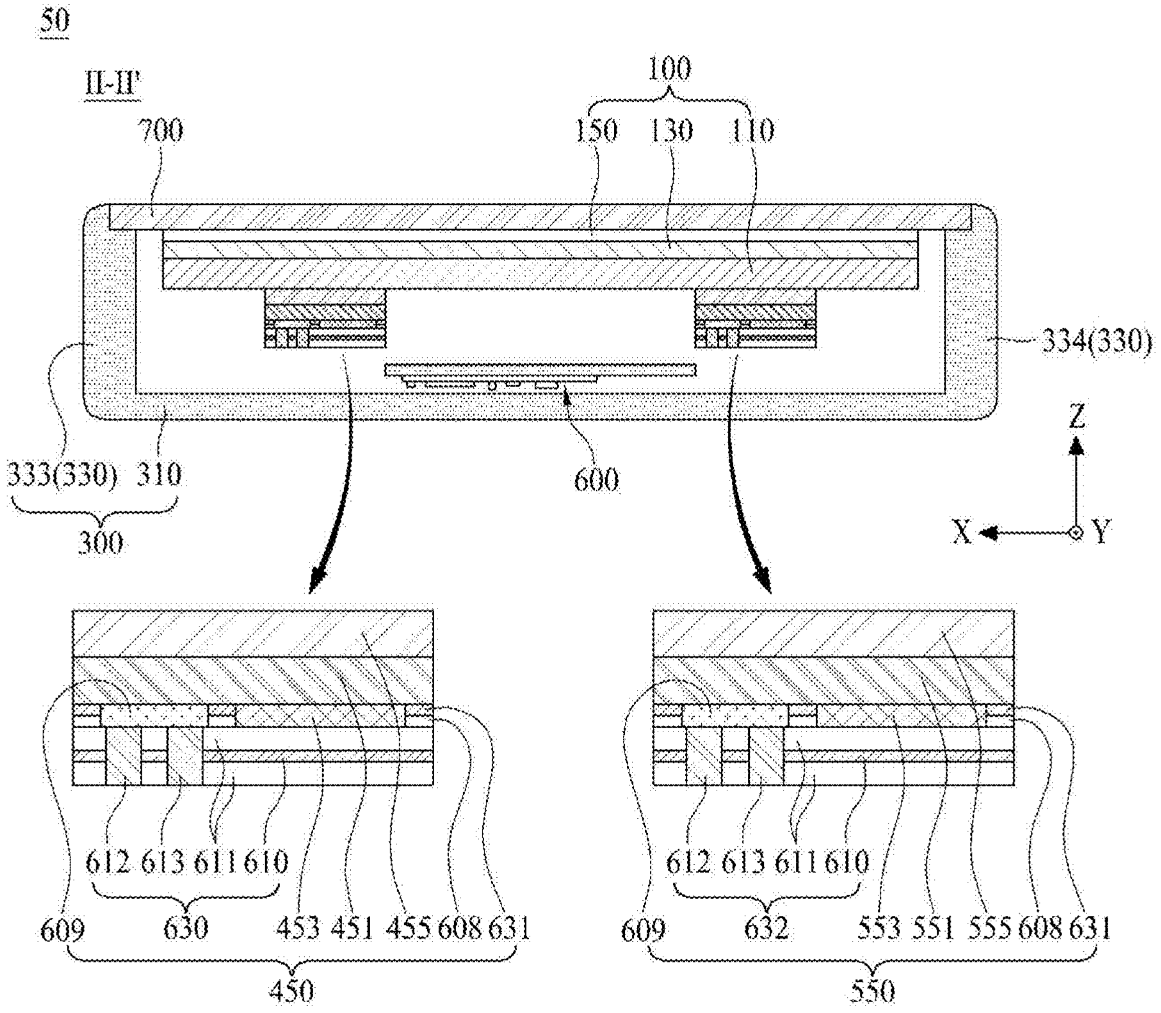
FIG. 12 is a cross-sectional view taken along line II-IF illustrated in FIG. 10 according to another embodiment of the present disclosure.

FIG. 12 is a cross-sectional view taken along line II-IF illustrated in FIG. 10 according to another embodiment of the present disclosure.

With reference to FIG. 12, a display apparatus 50 according to an embodiment of the present disclosure may include a display module 100, a supporting member 300, a first sound generating module 450, and a second sound generating module 550. The display module 100 may include a display panel 110. The display module 100, the display panel 110, and the supporting member 300 are as described above with reference to FIGS. 1 and 2, and thus, their descriptions are omitted or will be briefly given below. The sound generating module, the vibration generating device, and the circuit board each described above with reference to FIGS. 7 and 8 may respectively be a first sound generating module, a first vibration generating device, and a first circuit board each illustrated in FIG. 12.

The first sound generating module 450 according to an embodiment of the present disclosure may include a first vibration generating device 451 and a circuit board 630 on a lower surface of the first vibration generating device 451. The first vibration generating device 451 may be disposed on or coupled or connected to the circuit board 630 and the display panel 110 by an adhesive member. For example, the first vibration generating device 451 may be disposed on or coupled or connected to the circuit board 630 by a first adhesive member 453. For example, the first vibration generating device 451 may be disposed on or coupled or connected to the display panel 110 by a second adhesive member 455. An elastic modulus of the first adhesive member 453 may differ from that of the second adhesive member 455. For example, the elastic modulus of the first adhesive member 453 may be higher than that of the second adhesive member 455. For example, the elastic modulus of the first adhesive member 453 may be 1 GPa to 200 GPa. For example, an elastic modulus of the second adhesive member 455 may be 0.1 MPa to 30 MPa. For example, the second adhesive member 455 adjacent to the display panel 110 may be formed of a material having an elastic modulus which is lower than that of the first adhesive member 453, so as not to affect a sound pressure level corresponding to a low frequency when the first sound generating module 450 vibrates. For example, the first adhesive member 453 may include a sticking agent or an adhesive each including at least one of a cyanoacrylate adhesive, an epoxy-based adhesive, an acrylate adhesive, and an acrylic adhesive, but is not limited thereto. For example, the second adhesive member 455 may include a sticking agent or an adhesive each including at least one of a double-sided tape, acrylic resin, epoxy-based resin, silicon-based resin, polyurethane-based resin, and polyvinyl alcohol-based resin, but is not limited thereto. The first adhesive member 453 and the second adhesive member 455 may each be a sticking member or a sticking agent, but the term is not limited thereto.

The second sound generating module 550 according to an embodiment of the present disclosure may include a second vibration generating device 551 and a second circuit board 632 on a lower surface of the second vibration generating device 551.

The second vibration generating device 551 may be disposed on or coupled or connected to the second circuit board 632 and the display panel 110 by an adhesive member. For example, the second vibration generating device 551 may be disposed on or coupled or connected to the second circuit board 632 by a third adhesive member 553. For example, the second vibration generating device 551 may be disposed on or coupled or connected to the display panel 110 by a fourth adhesive member 555. An elastic modulus of the third adhesive member 533 may differ from that of the fourth adhesive member 555. For example, the elastic modulus of the third adhesive member 553 may be higher than that of the fourth adhesive member 555. For example, the elastic modulus of the third adhesive member 553 may be 1 GPa to 200 GPa. For example, an elastic modulus of the fourth adhesive member 555 may be 0.1 MPa to 30 MPa. For example, the fourth adhesive member 555 adjacent to the display panel 110 may be formed of a material having an elastic modulus which is lower than that of the third adhesive member 553, so as not to affect a sound pressure level corresponding to a low frequency when the second sound generating module 550 vibrates. For example, the third adhesive member 553 may include a sticking agent or an adhesive each including at least one of a cyanoacrylate adhesive, an epoxy-based adhesive, an acrylate adhesive, and an acrylic adhesive, but is not limited thereto. For example, the fourth adhesive member 555 may include a sticking agent or an adhesive each including at least one of a double-sided tape, acrylic resin, epoxy-based resin, silicon-based resin, polyurethane-based resin, and polyvinyl alcohol-based resin, but is not limited thereto. The third adhesive member 553 and the fourth adhesive member 555 may each be a sticking member or a sticking agent, but the term is not limited thereto. Therefore, since a reinforcement member is provided and an adhesive member having a high elastic modulus is provided, an impact resistance against an external impact may be enhanced, and a sound pressure level may be enhanced.

The first circuit board 630 may be on a lower surface of the first vibration generating device 451. The first circuit board 630 may include a base film 610, a first electrode 612, a second electrode 613, and a passivation layer 611. The first circuit board 630 has been described above with reference to FIG. 7, and thus, its detailed description is omitted and a second circuit board will be described below. The second circuit board 630 may be on a lower surface of the second vibration generating device 531. The second circuit board

632 may include a base film 610, a first electrode 612, a second electrode 613, and a passivation layer 611. The base film 610 of each of the first circuit board 630 and the second circuit board 632 may be formed of a polyimide-based material. The first electrode 612 and the second electrode 613 may be on a lower surface of the second vibration generating device 551. The first electrode 612 may be an electrode for applying a signal to the second vibration generating device 551 and may be a VDD electrode or a common electrode. The second electrode 613 may be a ground electrode. The first electrode 612 and the second electrode 613 may be formed of an opaque metal material which has relatively low resistance and has good heat dissipation characteristic. However, embodiments are not limited thereto. For example, the first electrode 612 and the second electrode 613 may be formed of a transparent conductive material or a conductive polymer material. The passivation layer 611 may be disposed for protecting a line between the first electrode 612 and the second electrode 613. For example, the passivation layer 611 may be in a region except the first electrode 612 and the second electrode 613, but is not limited thereto. For example, the passivation layer 611 may be on each of the upper surface and the lower surface of the base film 610. For example, the passivation layer 611 may be configured as a type where a sticking agent or an adhesive is coated on a polyimide-based film, but is not limited thereto. For example, the sticking agent or the adhesive may include at least one of a cyanoacrylate adhesive, an epoxy-based adhesive, an acrylate adhesive, and an acrylic adhesive, but is not limited thereto.

A fifth adhesive member 609 may be on the first electrode 612 and the second electrode 613. For example, the fifth adhesive member 609 may be formed of a material differing from that of the third adhesive member 553. For example, the fifth adhesive member 609 may be formed of a conductive adhesive. For example, the conductive adhesive may include thermocurable resin including a conductive filler or a thermocurable polymer including a conductive filler, but is not limited thereto. For example, the third adhesive member 553 may be formed of a material having a high elastic modulus. An adhesive may be attached to the second circuit board 632. The second circuit board 632 may be attached to the display panel through a compression process and a curing process in a case which attaches the second circuit board 632 on the display panel, and in the compression process and the curing process, the adhesive of the second circuit board 632 may flow out to the outside. A member 631 may be further provided between the third adhesive member 553 and the fifth adhesive member 609, for reducing or preventing a defect such as the partial detachment of the second circuit board 632 caused by the adhesive. Therefore, the member 631 may separate the third adhesive member 553 from the fifth adhesive member 609. For example, the member 631 may be formed of a polyimide-based material or a polycarbonate-based material, but is not limited thereto. Accordingly, since the member 631 is provided between the third adhesive member 553 and the fifth adhesive member 609, the adhesive of the second circuit board 632 may be reduced or prevented from flowing out to the outside in the compression process and the curing process. Therefore, an adhesive surface between the second circuit board 632 and the third adhesive member 553 may be uniform, and thus, a defect such as the partial detachment of the second circuit board 632 may be prevented.

A sixth adhesive member 608 may be between the second circuit board 632 and the member 631. For example, the sixth adhesive member 608 may be between the base film 610 and the member 631. The member 631 may be disposed on or coupled or connected to the second circuit board 632 by the sixth adhesive member 608. The sixth adhesive member 608 may be formed of an acrylic material or an epoxy-based material, but is not limited thereto.

Figure 13:
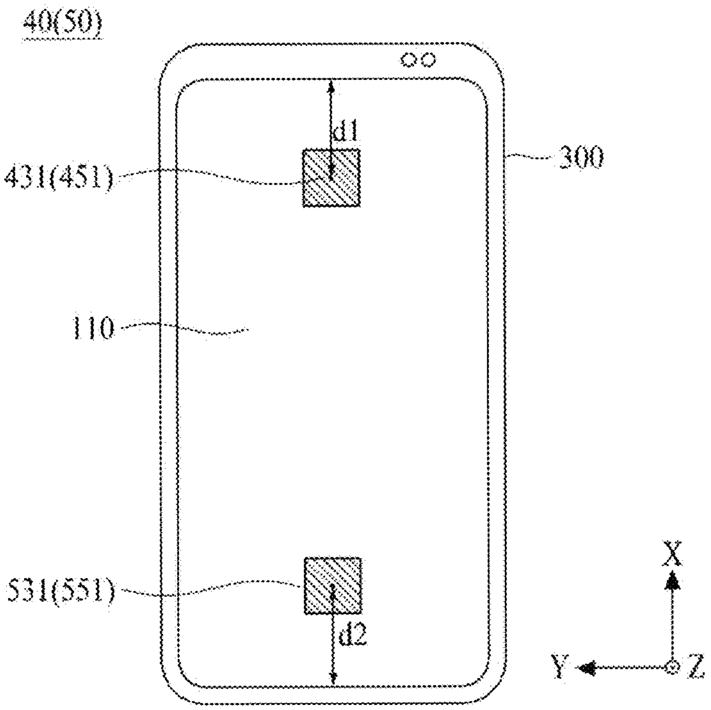
FIG. 13 illustrates a rear view of a display panel according to another embodiment of the present disclosure.

FIG. 13 is a rear view of a display panel according to another embodiment of the present disclosure.

With reference to FIG. 9, each of a plurality of first sound generating modules 430 and 450 may be on an upper portion of a rear surface of a display panel 110. The display panel 110 may include a first short side, a second short side facing the first short side, and a long side vertical to the first short side or the second short side. For example, the first short side and the second short side may be in a widthwise direction of the display panel 110, and the long side may be in a lengthwise direction of the display panel 110. The widthwise direction and the lengthwise direction may be interchangeable. For example, a distance d1 between a center of each of a plurality of first vibration generating devices 431 and 451 and the first short side of the display panel 110 may be ¼ to ⅓ of the long side of the display panel 110. When the first sound generating modules 430 and 450 are on the upper portion of the rear surface of the display panel 110, a sound pressure level may be more improved than when the sound generating modules 430 and 450 are disposed at a center of the display panel 110. Each of a plurality of second sound generating modules 530 and 550 may be disposed on a lower portion of the rear surface of the display panel 110. For example, a distance d2 between a center of each of a plurality of second vibration generating devices 531 and 552 and an end of the second short side of the display panel 110 may be ¼ to ⅓ of the long side of the display panel 110. The second short side of the display panel 110 may be a side facing the first short side. The second sound generating modules 530 and 550 may be disposed to be symmetrical with the first sound generating modules 430 and 450 with respect to a center of the display module 100.

Figure 14:
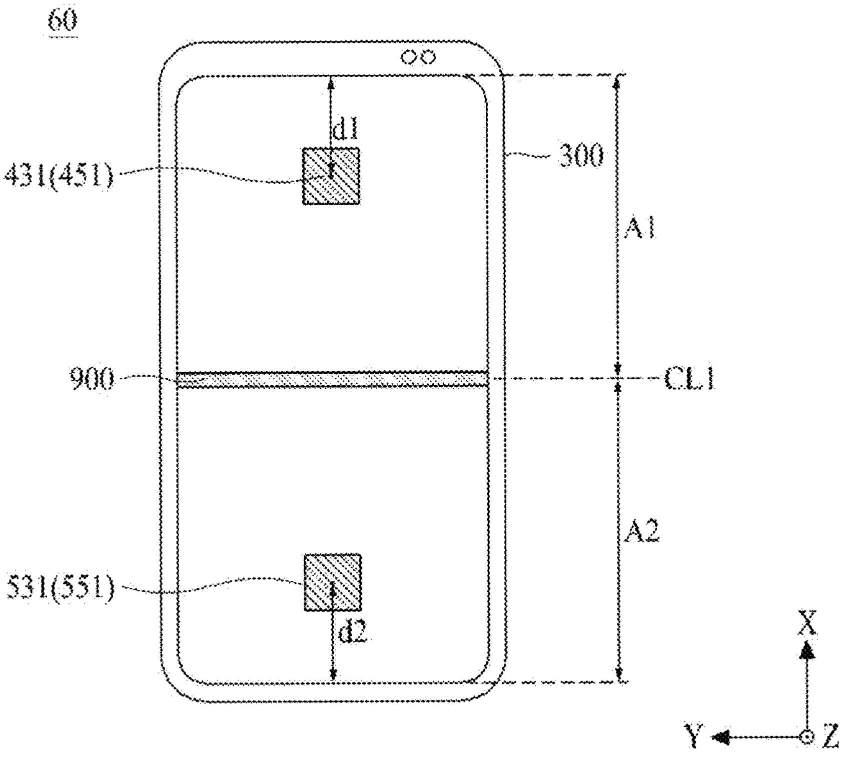
FIG. 14 illustrates a rear view of a display panel according to another embodiment of the present disclosure.

FIG. 14 is a rear view of a display panel according to another embodiment of the present disclosure.

With reference to FIG. 14, a display apparatus 60 according to an embodiment of the present disclosure may include a plurality of first sound generating modules 430 and 450 and a plurality of second sound generating modules 530 and 550. The first sound generating modules 430 and 450 may vibrate a first rear region A1 of a display module 100 based on a vibration driving signal provided from circuit boards 625 and 630 of a driving circuit 600. The first rear region A1 may be a rear right region or a region between a rear center portion or a center portion CL1 of the display module 100 and one end of the display module 100 with respect to a lengthwise direction or a long-side direction X of the display module 100. For example, the first rear region A1 may be a right upper periphery region or a left upper periphery region or other periphery region of the display module 100 with respect to the lengthwise direction or the long-side direction X of the display module 100.

The second sound generating modules 530 and 550 may vibrate a second rear region A2 of the display module 100 based on the vibration driving signal from circuit boards 626 and 632 of the driving circuit 600. The second rear region A2 may be a rear right region or a region between the center portion CL1 of the display module 100 and the other end of the display module 100 with respect to the lengthwise direction or a long-side direction X of the display module 100. For example, the second rear region A2 may be a left periphery region or a right periphery region or the other periphery region of the display module 100 with respect to the lengthwise direction or the long-side direction X of the display module 100. The second sound generating modules 530 and 550 may be disposed to be symmetrical with the first sound generating modules 430 and 450. For example, the second sound generating modules 530 and 550 may be disposed to be symmetrical with the first sound generating modules 430 and 450 with respect to the center portion CL1 of the display module 100.

The display apparatus 60 according to an embodiment of the present disclosure may further include a partition 900. The partition 900 may be disposed at the rear center portion CL1 of the display module 100. For example, the partition 900 may be between the first sound generating modules 430 and 450 and the second sound generating modules 530 and 550. For example, the partition 900 may spatially separate or divide the first rear region A1 overlapping the first sound generating modules 430 and 450 and the second rear region A2 overlapping the second sound generating modules 530 and 550 at the rear surface of the display panel 110, thereby reducing or preventing interference between sounds generated by the first rear region A1 and the second rear region A2. The partition 900 may spatially separate or divide the first rear region A1 and the second rear region A2 each provided in a rear surface of the display module 100 (or the display panel 110) to prevent interference between the sounds generated by the first rear region A1 and the second rear region A2. Accordingly, the partition 900 may separate sounds generated by first vibration generating devices 431 and 451 and second vibration generating devices 531 and 551 to reduce or prevent interference between the generated sounds, thereby allowing a 2.0-channel sound to be output to a forward region with respect to the display module 100 based on a vibration of the display module 100.

The partition 900 may be between a rear surface of the display module 100 and a supporting member rear part 310 of the supporting member 300. A rear surface of the partition 900 may be attached to the supporting member rear part 310 of the supporting member 300, and a front surface of the partition 900 may be attached to the rear surface of the display module 100, may contact the rear surface of the display module 100 in a contactless type. For example, the partition 900 may be formed of a double-sided tape, a double-sided foam pad, a single-sided tape, a single-sided foam pad, an adhesive, and/or a bond, but is not limited thereto. The partition 900 may be referred to as an "enclosure" or a "baffle," but the term is not limited thereto.

The sound generating device described above with reference to FIGS. 6 to 14 may be applied to a speaker and a receiver such as an electronic apparatus. A receiver may transfer a call voice based on an electronic apparatus to ears of a user. For example, when the first sound generating modules 430 and 450 operates as a receiver such as an electronic apparatus, the first sound generating modules 430 and 450 may receive the vibration driving signal from the sound processing circuit. For example, when the first sound generating modules 430 and 450 are applied to a receiver such as an electronic apparatus, the first sound generating modules 430 and 450 may transfer a sound of the low-pitched sound band and a sound of the high-pitched sound band, improved by the first vibration generating device and the second vibration generating device, to a user, or the user may receive the improved sound of the low-pitched sound band and the improved sound of the high-pitched sound band, thereby providing a display apparatus for providing an enhanced call voice to a user. For example, when each of the first sound generating modules 430 and 450 and the second sound generating modules 530 and 550 operates as a speaker such as an electronic apparatus, each of the first sound generating modules 430 and 450 and the second sound generating modules 530 and 550 may receive the vibration driving signal from the sound processing circuit. Accordingly, a sound of the low-pitched sound band and a sound of the high-pitched sound band improved by the first vibration generating module and the second vibration generating module may be transferred to the user.

Figure 15A:
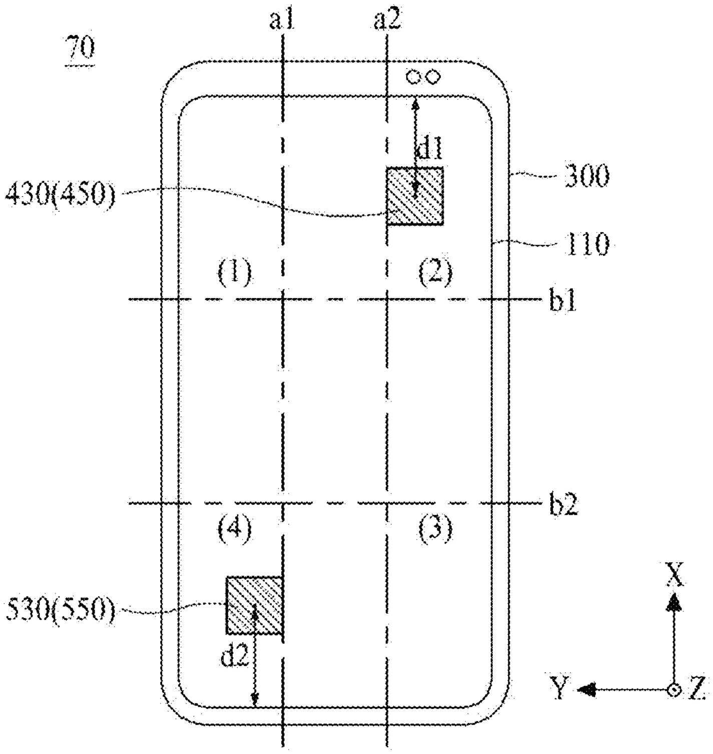
FIGS. 15A and 15B are rear views of a display panel according to another embodiment of the present disclosure.
Figure 15B:
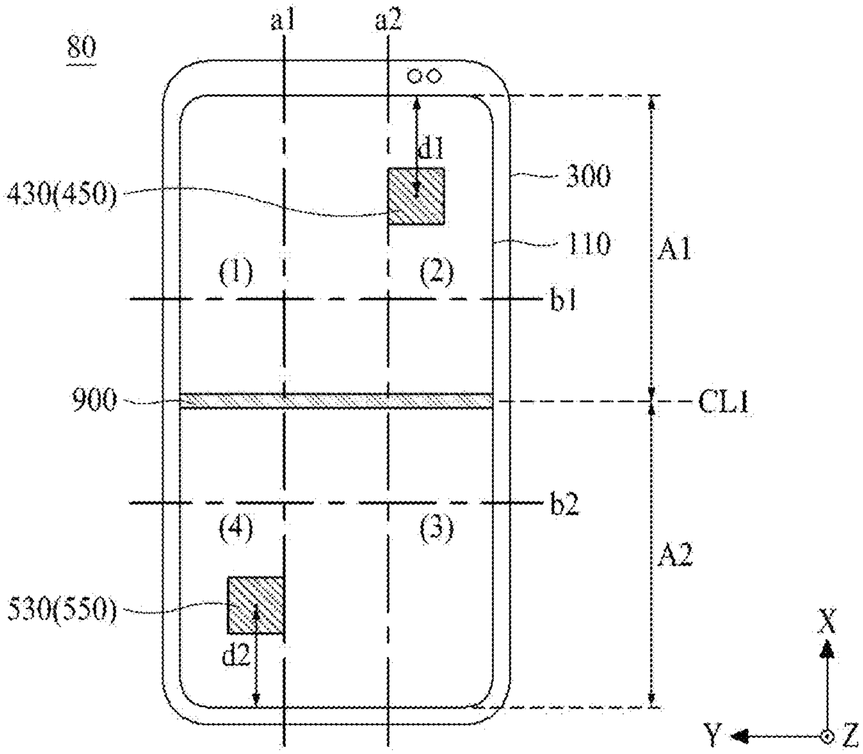

FIGS. 15A and 15B are rear views of a display panel according to another embodiment of the present disclosure.

With reference to FIG. 15A, a display apparatus 70 according to an embodiment of the present disclosure may include a plurality of first sound generating modules 430 and 450 and a plurality of second sound generating modules 530 and 550. The display panel 110 may include a first short side, a second short side facing the first short side, and a long side vertical to the first short side or the second short side. For example, the first short side and the second short side may be in a widthwise direction of the display panel 110, and the long side may be in a lengthwise direction of the display panel 110. The widthwise direction and the lengthwise direction may be interchangeable. The display panel 110 may be divided into three regions with respect to a long-side direction X or the lengthwise direction of the display panel 110 and may be divided into three regions with respect to a short-side direction Y or the widthwise direction of the display panel 110. For example, the long side of the display panel 110 may be divided into three equal portions with respect to a first lengthwise direction a1 and a second lengthwise direction a2. The short side of the display panel 110 may be divided into three equal portions with respect to a first widthwise direction b1 and a second widthwise direction b2. The display panel 110 may include four divided surfaces. For example, a left upper region where the first lengthwise direction a1 meets the first widthwise direction b1 may be a first four-divided surface (1). For example, a second four-divided surface (2) may be a right upper region where the second lengthwise direction a2 meets the first widthwise direction b1. For example, a third four-divided surface (3) may be a right lower region where the second lengthwise direction a2 meets the second widthwise direction b2. For example, a fourth four-divided surface (4) may be a left lower region where the first lengthwise direction a1 meets the second widthwise direction b2.

For example, the first sound generating modules 430 and 450 may not be disposed at a center portion of the rear surface of the display panel 110 and may be disposed on the second four-divided surface (2) which is the right upper region where the second lengthwise direction a2 meets the first widthwise direction b1. For example, the first sound generating modules 430 and 450 may be in a region where the second lengthwise direction a2 meets the first widthwise direction b1. For example, the first sound generating modules 430 and 450 may be disposed in a region which is divided in the first widthwise direction b1 and the second lengthwise direction a2. For example, the first sound generating modules 430 and 450 may be in a one-third region of the display panel 110 in the widthwise direction and a one-third region of the display panel 110 in the lengthwise direction. In FIG. 15A, the first sound generating modules 430 and 450 are illustrated as being disposed at specific positions of the second four-divided surface (2), but may be disposed at arbitrary positions of the second four-divided surface (2). For example, the first sound generating modules 430 and 450 may be on the second four-divided surface (2). For example, the second sound generating modules 530 and 550 may not be disposed at the center portion of the rear surface of the display panel 110 and may be on the fourth four-divided surface (4) which is the left lower region where the first lengthwise direction a1 meets the second widthwise direction b2. For example, the second sound generating modules 530 and 550 may be in a region where the first lengthwise direction a1 meets the second widthwise direction b2. For example, the second sound generating modules 530 and 550 may be in a region which is divided in the first lengthwise direction a1 and the second widthwise direction b2. For example, the second sound generating modules 530 and 550 may be disposed in a one-third region of the display panel 110 in the widthwise direction and a one-third region of the display panel 110 in the lengthwise direction. In FIG. 15A, the second sound generating modules 530 and 550 are illustrated as being disposed at specific positions of the fourth four-divided surface (4), or may be disposed at arbitrary positions of the fourth four-divided surface (4). For example, the second sound generating modules 530 and 550 may be in the fourth four-divided surface (4). The first sound generating modules 430 and 450 and the second sound generating modules 530 and 550 may be disposed to be symmetrical with respect to a diagonal line of the display panel 110. When sound generating modules are disposed in this manner, the sound generating modules may be disposed regardless of a size of a display panel. For example, sound generating modules may be easily disposed in a display apparatus, including a display panel having a small size like small electronic apparatuses, or a display apparatus including a display panel having a large size like televisions (TVs). Accordingly, a stereo sound may be enhanced, and a sound generating module may be applied to a speaker.

For example, a center of each of first vibration generating devices 431 and 451 of the first sound generating modules 430 and 450 may be spaced apart from a center region of the display module 100. For example, a center of each of second vibration generating devices 431 and 451 of the second sound generating modules 530 and 550 may be spaced apart from a center region of the display module 100. For example, a distance d1 between the center of each of the first vibration generating devices 431 and 451 and the first short side of the display panel 110 may be ¼ to ⅓ of the long side of the display panel 110. For example, a distance d2 between the center of each of the second vibration generating devices 531 and 551 and the second short side of the display panel 110 may be ¼ to ⅓ of the long side of the display panel 110.

With reference to FIG. 15B, a display apparatus 80 according to an embodiment of the present disclosure may further include a partition 900. The partition 900 may be disposed at a rear center portion CL1 of a display module 100. For example, the partition 900 may be between first sound generating modules 430 and 450 and second sound generating modules 530 and 550. For example, the partition 900 may spatially separate or divide a first rear region A1 overlapping the first sound generating modules 430 and 450 and a second rear region A2 overlapping the second sound generating modules 530 and 550 at the rear surface of the display panel 100, thereby reducing or preventing interference between sounds generated by the first rear region A1 and the second rear region A2. The partition 900 may spatially separate or divide the first rear region A1 and the second rear region A2 each provided in a rear surface of the display module 100 (or the display panel 100) to reduce or prevent interference between the sounds generated by the first rear region A1 and the second rear region A2. Accordingly, the partition 900 may separate sounds generated by first vibration generating devices 431 and 451 and second vibration generating devices 531 and 551 to reduce or prevent interference between the generated sounds, thereby allowing a 2.0-channel sound to be output to a forward region with respect to the display module 100 based on a vibration of the display module 100. Also, a sound generating module for enhancing a stereo sound may be provided.

Figure 16A:
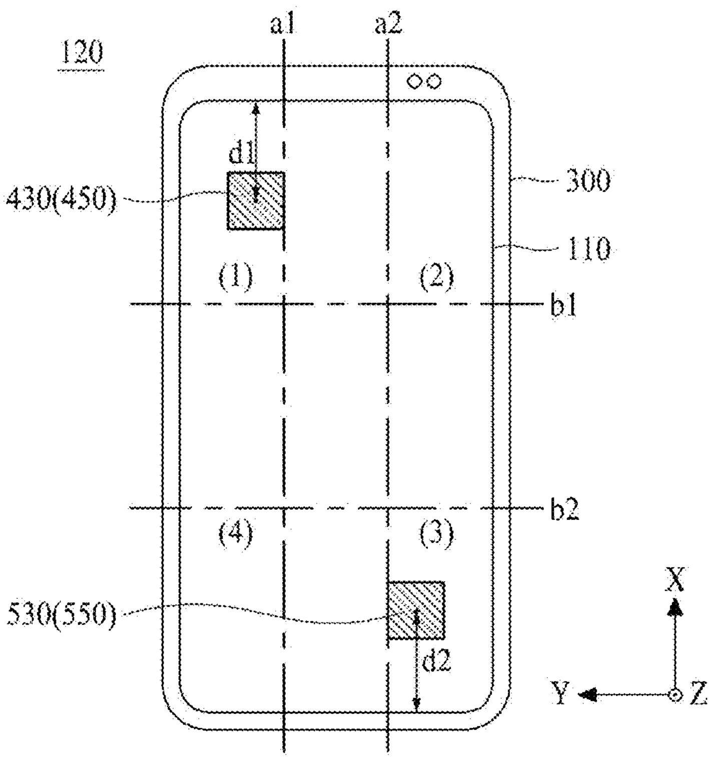
FIGS. 16A and 16B are rear views of a display panel according to another embodiment of the present disclosure.
Figure 16B:
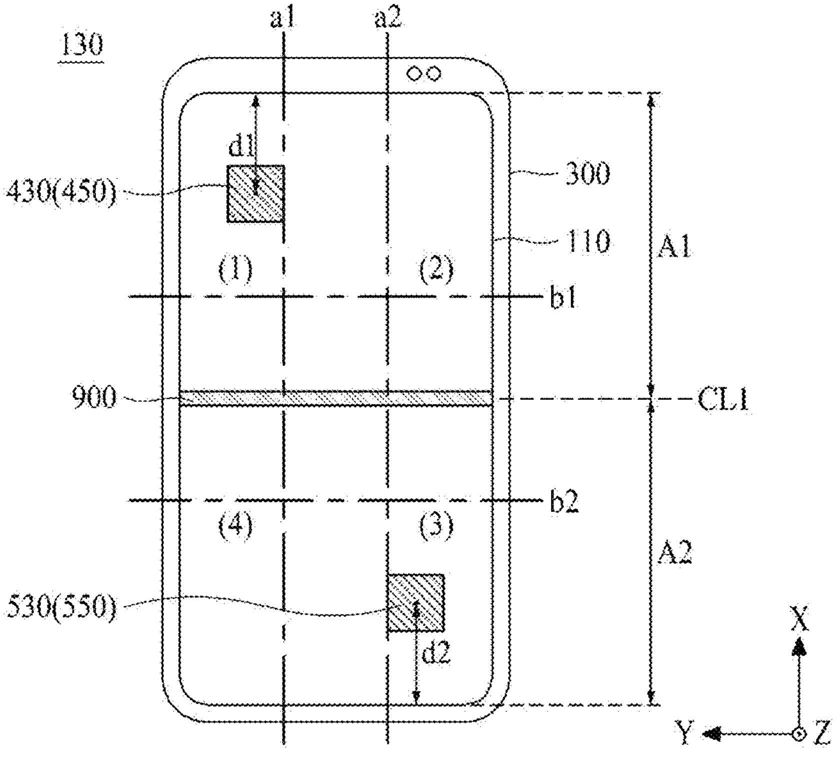

FIGS. 16A and 16B are rear views of a display panel according to another embodiment of the present disclosure.

With reference to FIG. 16A, a display apparatus 120 according to an embodiment of the present disclosure may include a plurality of first sound generating modules 430 and 450 and a plurality of second sound generating modules 530 and 550. The display panel 110 may include a first short side, a second short side facing the first short side, and a long side vertical to the first short side or the second short side. For example, the first short side and the second short side may be in a widthwise direction of the display panel 110, and the long side may be in a lengthwise direction of the display panel 110. The widthwise direction and the lengthwise direction may be interchangeable. The display panel 110 may be divided into three regions with respect to a long-side direction X or the lengthwise direction of the display panel 110 and may be divided into three regions with respect to a short-side direction Y or the widthwise direction of the display panel 110. For example, the long side of the display panel 110 may be divided into three equal portions with respect to a first lengthwise direction a1 and a second lengthwise direction a2. The short side of the display panel 110 may be divided into three equal portions with respect to a first widthwise direction b1 and a second widthwise direction b2. The display panel 110 may include four divided surfaces. For example, a left upper region where the first lengthwise direction a1 meets the first widthwise direction b1 may be a first four-divided surface (1). For example, a second four-divided surface (2) may be a right upper region where the second lengthwise direction a2 meets the first widthwise direction b1. For example, a third four-divided surface (3) may be a right lower region where the second lengthwise direction a2 meets the second widthwise direction b2. For example, a fourth four-divided surface (4) may be a left lower region where the first lengthwise direction a1 meets the second widthwise direction b2.

For example, the first sound generating modules 430 and 450 may not be disposed at a center portion of the rear surface of the display panel 110 and may be disposed on the first four-divided surface (1) which is the left upper region where the first lengthwise direction a1 meets the first widthwise direction b1. For example, the first sound generating modules 430 and 450 may be disposed in a region where the first lengthwise direction a1 meets the first widthwise direction b1. For example, the first sound generating modules 430 and 450 may be disposed in a region which is divided in the first widthwise direction b1 and the first lengthwise direction a1. For example, the first sound generating modules 430 and 450 may be in a one-third region of the display panel 110 in the widthwise direction and a one-third region of the display panel 110 in the lengthwise direction. In FIG. 16A, the first sound generating modules 430 and 450 are illustrated as being disposed at specific positions of the first four-divided surface (1), or may be disposed at arbitrary positions of the first four-divided surface (1). For example, the first sound generating modules 430 and 450 may be disposed on the first four-divided surface (1). For example, the second sound generating modules 530 and 550 may not be disposed at the center portion of the rear surface of the display panel 110 and may be disposed on the third four-divided surface (3) which is the right lower region where the second lengthwise direction a2 meets the second widthwise direction b2. For example, the second sound generating modules 530 and 550 may be in a region where the second lengthwise direction a2 meets the second widthwise direction b2. For example, the second sound generating modules 530 and 550 may be disposed in a region which is divided in the second lengthwise direction a2 and the second widthwise direction b2. For example, the second sound generating modules 530 and 550 may be disposed in a one-third region of the display panel 110 in the widthwise direction and a one-third region of the display panel 110 in the lengthwise direction. In FIG. 16A, the second sound generating modules 530 and 550 are illustrated as being disposed at specific positions of the third four-divided surface (3), or may be disposed at arbitrary positions of the third four-divided surface (3). For example, the second sound generating modules 530 and 550 may be disposed in the third four-divided surface (3). The first sound generating modules 430 and 450 and the second sound generating modules 530 and 550 may be disposed to be symmetrical with respect to a diagonal line of the display panel 110. When sound generating modules are disposed in this manner, the sound generating modules may be disposed regardless of a size of a display panel. For example, sound generating modules may be easily disposed in a display apparatus, including a display panel having a small size like small electronic apparatuses, or a display apparatus including a display panel having a large size like televisions (TVs). Accordingly, a stereo sound may be enhanced, and a sound generating module may be applied to a speaker.

For example, a center of each of first vibration generating devices 431 and 451 of the first sound generating modules 430 and 450 may be spaced apart from a center region of the display module 100. For example, a center of each of second vibration generating devices 431 and 451 of the second sound generating modules 530 and 550 may be spaced apart from a center region of the display module 100. For example, a distance d1 between the center of each of the first vibration generating devices 431 and 451 and the first short side of the display panel 110 may be ¼ to ⅓ of the long side of the display panel 110. For example, a distance d2 between the center of each of the second vibration generating devices 531 and 551 and the second short side of the display panel 110 may be ¼ to ⅓ of the long side of the display panel 110.

With reference to FIG. 16B, a display apparatus 130 according to an embodiment of the present disclosure may further include a partition 900. The partition 900 may be disposed at a rear center portion CL1 of a display module 100. For example, the partition 900 may be between first sound generating modules 430 and 450 and second sound generating modules 530 and 550. For example, the partition 900 may spatially separate or divide a first rear region A1 overlapping the first sound generating modules 430 and 450 and a second rear region A2 overlapping the second sound generating modules 530 and 550 at the rear surface of the display panel 100, thereby reducing or preventing interference between sounds generated by the first rear region A1 and the second rear region A2. The partition 900 may spatially separate or divide the first rear region A1 and the second rear region A2 each provided in a rear surface of the display module 100 (or the display panel 100) to prevent interference between the sounds generated by the first rear region A1 and the second rear region A2. Accordingly, the partition 900 may separate sounds generated by first vibration generating devices 431 and 451 and second vibration generating devices 531 and 551 to reduce or prevent interference between the generated sounds, thereby allowing a 2.0-channel sound to be output to a forward region with respect to the display module 100 based on a vibration of the display module 100. Also, a sound generating module for enhancing a stereo sound may be provided.

Figure 17:
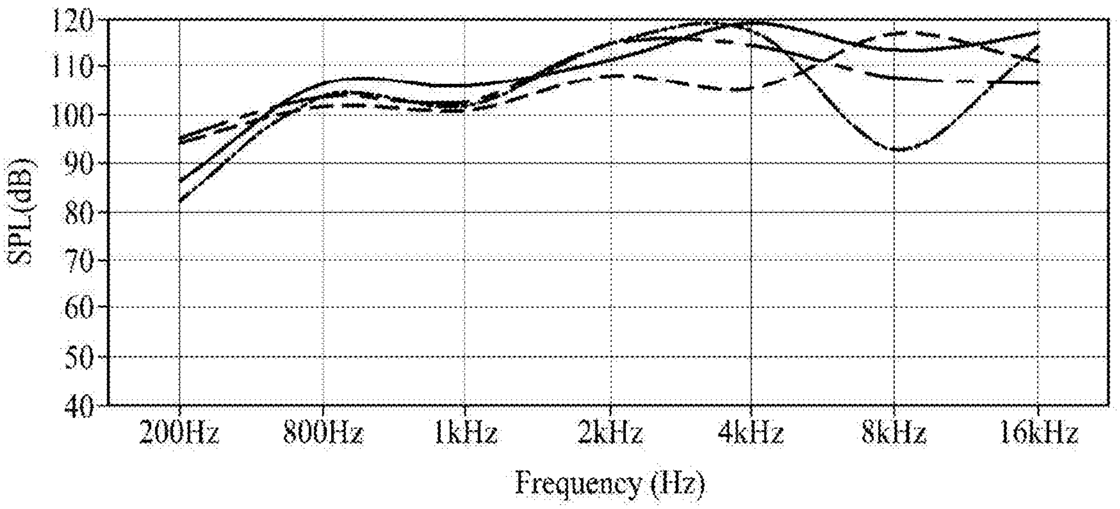
FIG. 17 illustrates a sound output characteristic of a sound generating module according to an embodiment of the present disclosure.

FIG. 17 illustrates a sound output characteristic of a sound generating module according to an embodiment of the present disclosure.

In FIG. 17, a dotted line represents a sound output characteristic of a sound generating module which includes a vibration generating device where a widthwise-direction length is longer than a lengthwise-direction length and is disposed at a center of the rear surface of the display panel of FIG. 13. A one-dot-dashed line represents a sound output characteristic of a sound generating module which includes a vibration generating device where a widthwise-direction length is equal to a lengthwise-direction length and is disposed at the center of the rear surface of the display panel of FIG. 13. A two-dot-dashed line represents a sound output characteristic of the sound generating module of FIG. 13 including a vibration generating device where a widthwise-direction length is equal to a lengthwise-direction length. A solid line represents a sound output characteristic of the sound generating module of FIG. 15A including a vibration generating device where a widthwise-direction length is equal to a lengthwise-direction length. In FIG. 17, the abscissa axis (x-axis) represents a frequency in hertz (Hz), and the ordinate axis (y-axis) represents a sound pressure level (SPL) in decibel (dB).

The sound output characteristic may be measured by a sound analysis apparatus. The sound analysis apparatus may include a sound card which transmits or receives a sound to or from a control personal computer (PC), an amplifier which amplifies a signal generated from the sound card and transfers the amplified signal to the sound generating module, and a microphone which collects a sound generated by the sound generating module in a display panel. The sound collected through the microphone may be input to the control PC through the sound card, and a control program may check the input sound to analyze the sounds of the sound generating module.

A sound output characteristic has been measured in an anechoic chamber which is closed in all directions, and measurement equipment has used Audio Precision company's APX525. Measurement has been performed under a condition where a driving voltage is 30 Vpp and a sound pressure level measurement distance to a center of a sound generating module is about 5 cm. An applied frequency signal has been applied as a sine sweep within a range of 20 Hz to 20 kHz, and ⅓ octave smoothing has been performed on a measurement result. A measurement method is not limited thereto.

With reference to FIG. 17, in comparison with a case (represented by a dotted line) including a sound generating device where a widthwise-direction length is longer than a lengthwise-direction length, it may be seen that, in a case (represented by a one-dot-dashed line) including a sound generating device where a widthwise-direction length is equal to a lengthwise-direction length, a sound pressure level is enhanced in about 200 Hz or less corresponding to the low sound band. Therefore, as described above with reference to FIG. 5, it may be seen that a sound generating module, including a sound generating device where a widthwise-direction length is equal to a lengthwise-direction length, enhances a sound pressure level.

For example, in comparison with a sound generating module (represented by a one-dot-dashed line) disposed at a center of a rear surface of a display panel, it may be seen that, in a sound generating module (represented by a two-dot-dashed line) disposed in an upper portion of a rear surface of a display panel, a sound pressure level is enhanced in about 800 Hz corresponding to the middle-pitched sound band and about 1 kHz or more corresponding to the high-pitched sound band. Accordingly, when a sound generating module is disposed in an upper portion of a rear surface of a display panel, it may be seen that a sound pressure level is enhanced.

For example, in comparison with a sound generating module (represented by a two-dot-dashed line) disposed at a center of a rear surface of a display panel, it may be seen that, in a sound generating module (represented by a solid line) disposed in an upper portion of a rear surface of a display panel and disposed in a diagonal direction, a sound pressure level is enhanced in about 200 Hz or less corresponding to the low-pitched sound band. Also, it may be seen that a sound pressure level is enhanced in about 800 Hz corresponding to the middle-pitched sound band and about 1 kHz or more corresponding to the high-pitched sound band. Accordingly, when a sound generating module is disposed in an upper portion of a rear surface of a display panel and disposed in a diagonal direction, it may be seen that a sound pressure level is enhanced in the low-pitched sound band and the high-pitched sound band. Also, when the sound generating module represented by the solid line is applied to a speaker of an electronic apparatus or the like, it may be seen that a frequency response is flat compared to other sound generating modules. For example, it may be seen that the sound generating module represented by the solid line has a flat sound pressure characteristic in a total frequency domain, thereby providing a display apparatus including a speaker having a flat sound pressure level in the total frequency domain.

Figure 18A:
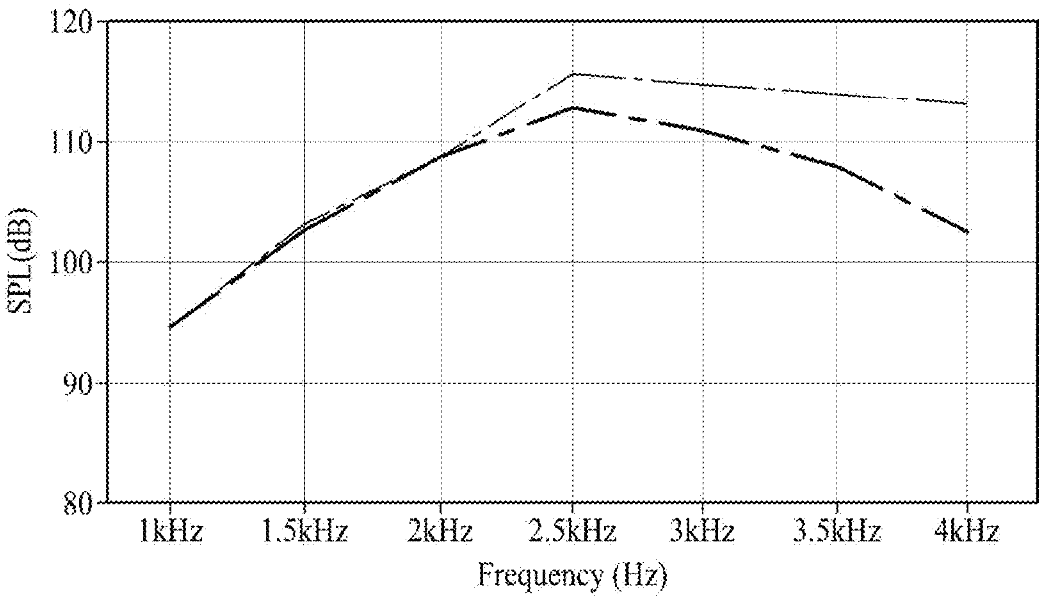
FIGS. 18A and 18B illustrate a sound output characteristic of a sound generating module according to an embodiment of the present disclosure.
Figure 18B:
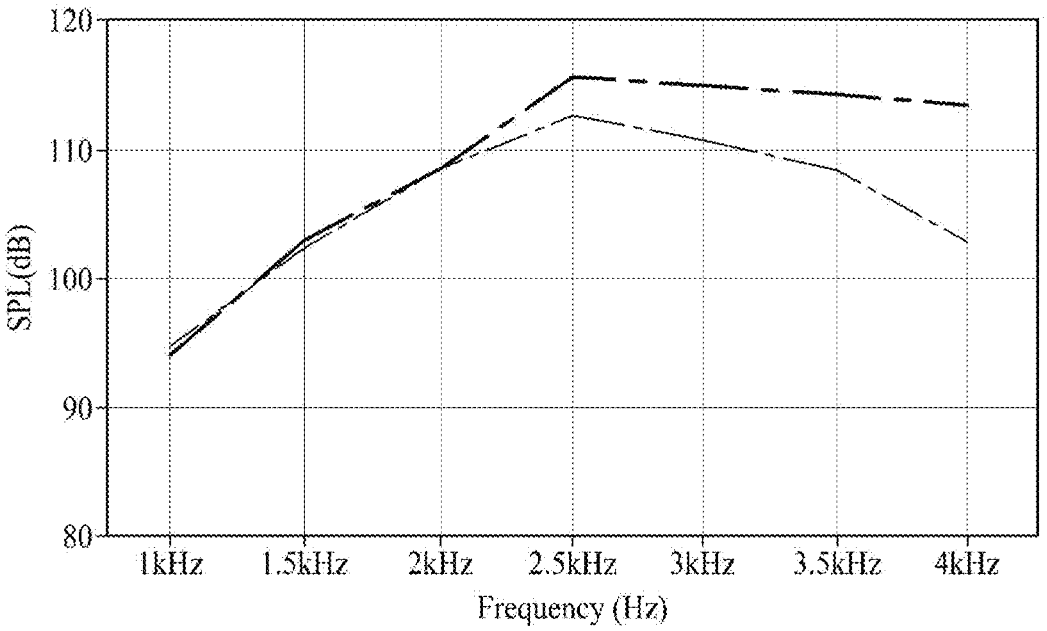

FIGS. 18A and 18B illustrate a sound output characteristic of a sound generating module according to an embodiment of the present disclosure.

FIGS. 18A to 20B show results obtained through measurement performed for testing a stereo sound or a sound separation sensitivity of left and right sound generating modules. In FIGS. 18A and 18B, a sound output characteristic of a sound generating module represented by the one-dot-dashed line of FIG. 17 is shown. A one-dot-dashed line shows a sound output characteristic of the left sound generating module, and a one-dot-dashed thick line shows a sound output characteristic of the right sound generating module. FIG. 18A shows an example where a signal is applied to a first sound generating module, and FIG. 18B shows an example where a signal is applied to a second sound generating module. In FIGS. 18A and 18B, the abscissa axis (x-axis) represents a frequency in hertz (Hz), and the ordinate axis (y-axis) represents a sound pressure level (SPL) in decibel (dB). A method of measuring a sound output characteristic is the same as description given above with reference to FIG. 17, and thus, its detailed description is omitted.

With reference to FIGS. 18A and 18B, it may be seen that the sound output characteristic of the right sound generating module and the sound output characteristic of the left sound generating module are symmetrically shown. However, it may be seen that a sound pressure level is reduced in a frequency of about 2.5 kHz or more.

Figure 19A:
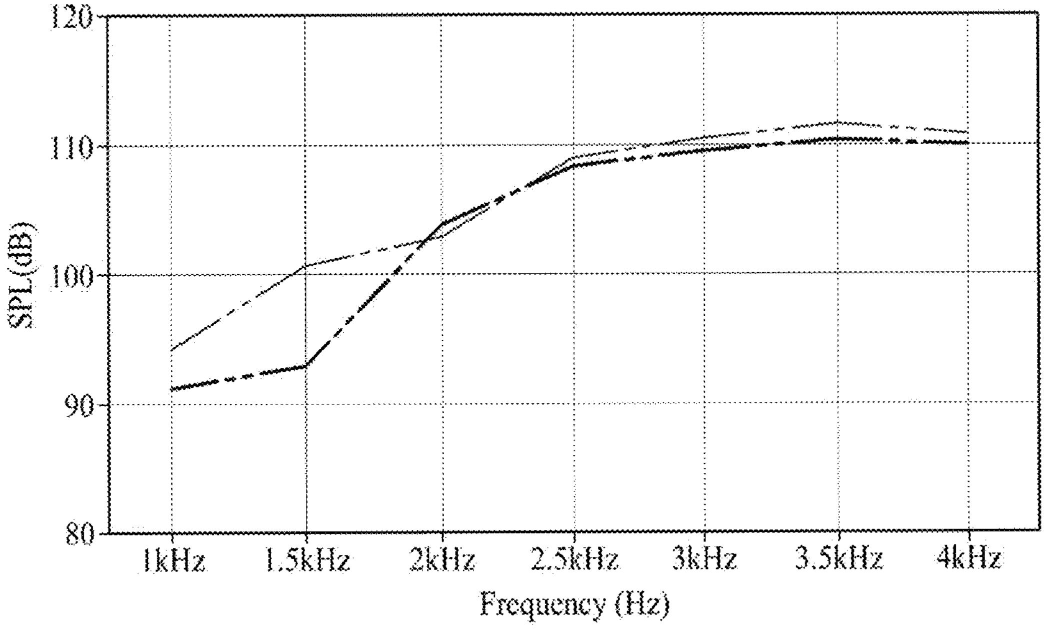
FIGS. 19A and 19B illustrate a sound output characteristic of a sound generating module according to an embodiment of the present disclosure.
Figure 19B:
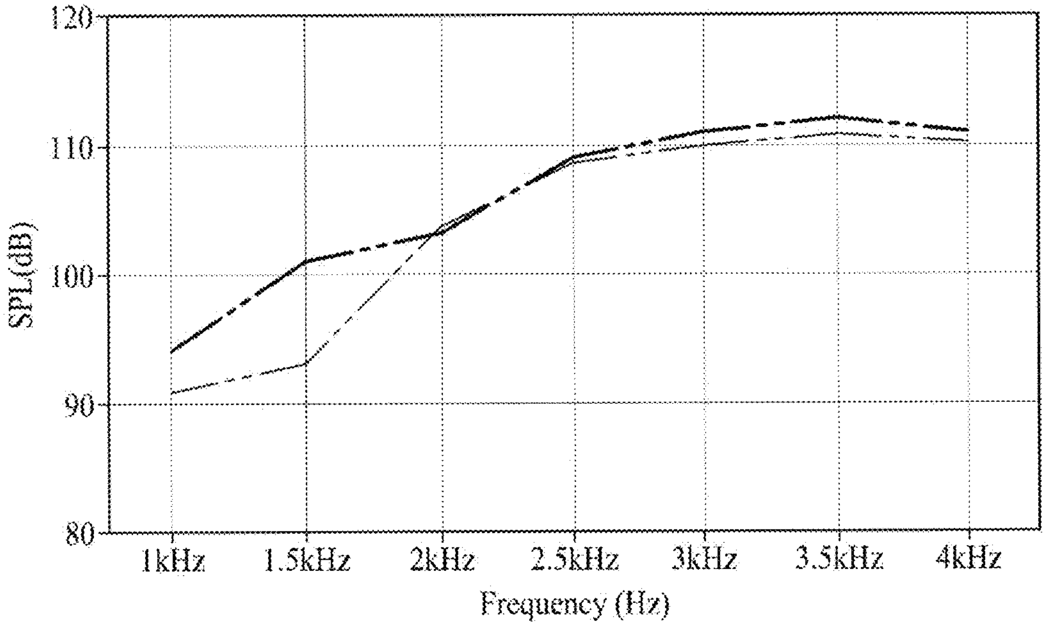

FIGS. 19A and 19B illustrate a sound output characteristic of a sound generating module according to an embodiment of the present disclosure.

In FIGS. 19A and 19B, a sound output characteristic of a sound generating module represented by the two-dot-dashed line of FIG. 17 is shown. A two-dot-dashed line shows a sound output characteristic of a left sound generating module, and a two-dot-dashed thick line shows a sound output characteristic of a right sound generating module. FIG. 19A shows an example where a signal is applied to a first sound generating module, and FIG. 19B shows an example where a signal is applied to a second sound generating module. In FIGS. 19A and 19B, the abscissa axis (x-axis) represents a frequency in hertz (Hz), and the ordinate axis (y-axis) represents a sound pressure level (SPL) in decibel (dB). A method of measuring a sound output characteristic is the same as description given above with reference to FIG. 17, and thus, its detailed description is omitted.

With reference to FIGS. 19A and 19B, it may be seen that the sound output characteristic of the right sound generating module and the sound output characteristic of the left sound generating module are symmetrically shown. However, it may be seen that a sound pressure level does not increase in a frequency of about 1 kHz or more.

Figure 20A:
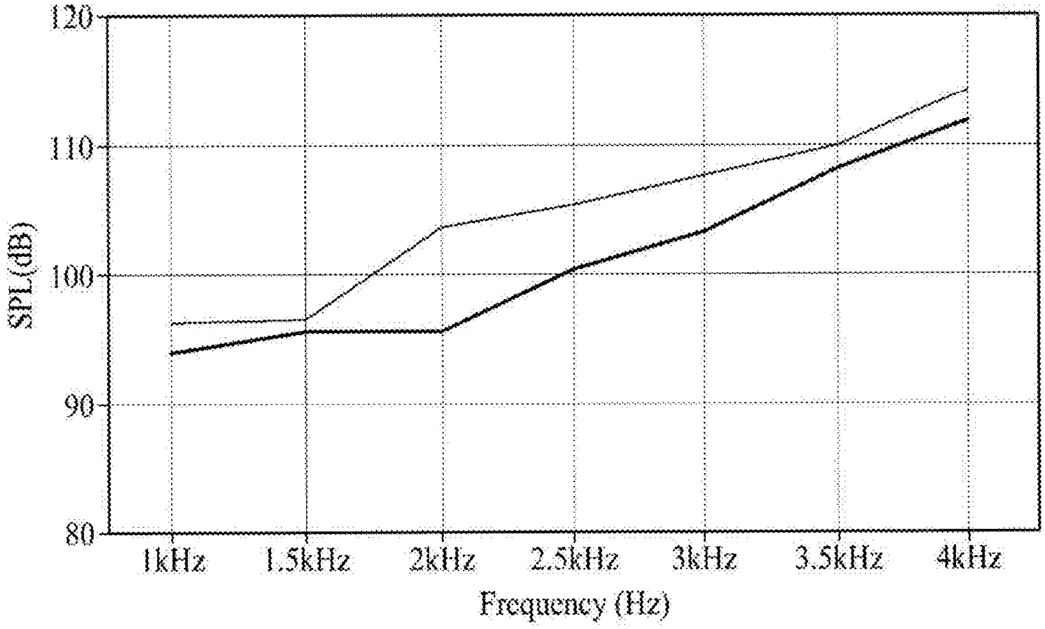
FIGS. 20A and 20B illustrate a sound output characteristic of a sound generating module according to an embodiment of the present disclosure.
Figure 20B:
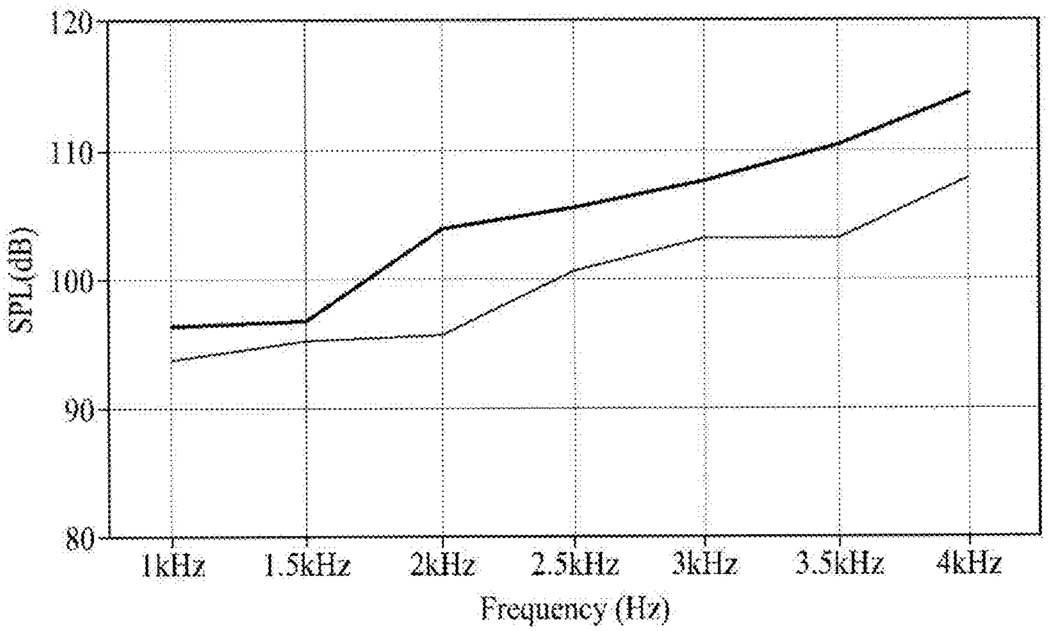

FIGS. 20A and 20B illustrate a sound output characteristic of a sound generating module according to an embodiment of the present disclosure.

In FIGS. 20A and 20B, a sound output characteristic of a sound generating module represented by the solid line of FIG. 17 is shown. A two-dot-dashed line shows a sound output characteristic of a left sound generating module, and a two-dot-dashed thick line shows a sound output characteristic of a right sound generating module. FIG. 20A shows an example where a signal is applied to a first sound generating module, and FIG. 20B shows an example where a signal is applied to a second sound generating module. In FIGS. 20A and 20B, the abscissa axis (x-axis) represents a frequency in hertz (Hz), and the ordinate axis (y-axis) represents a sound pressure level (SPL) in decibel (dB). A method of measuring a sound output characteristic is the same as description given above with reference to FIG. 17, and thus, its detailed description is omitted.

With reference to FIGS. 20A and 20B, it may be seen that the sound output characteristic of the right sound generating module and the sound output characteristic of the left sound generating module are symmetrically shown. Therefore, a left sound and a right sound may be separated from each other, and thus, a stereo sound may be enhanced. In FIGS. 18A and 18B, it may be seen that a sound pressure level is reduced in a frequency of about 2.5 kHz or more. In comparison with this, it may be seen that, in a sound generating module according to an embodiment of the present disclosure, a sound pressure level is enhanced in a frequency of about 2.5 kHz or more. In FIGS. 19A and 19B, it may be seen that a sound pressure level does not increase in a frequency of about 1 kHz or more. In comparison with this, it may be seen that, in the sound generating module according to an embodiment of the present disclosure, a sound pressure level is enhanced in a frequency of about 1 kHz or more. Accordingly, in the sound generating module according to an embodiment of the present disclosure, it may be seen that a stereo sound is enhanced, and moreover, a sound pressure level is enhanced in a frequency of the middle-high-pitched sound band.

A sound generating module according to an embodiment of the present disclosure may be applied as a sound generating module in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating module is applied to a lighting apparatus, the sound generating module may act as lighting and a speaker. The sound generating module according to an embodiment of the present disclosure may be applied to a receiver and/or a speaker such as an electronic apparatus.

A display apparatus according to an embodiment of the present disclosure will be described below.

According to an embodiment of the present disclosure, a display apparatus include a display module including a display panel configured to display an image and a sound generating module on a rear surface of the display panel, wherein the sound generating module includes a vibration generating device, a circuit board on a lower surface of the vibration generating device, a first adhesive member between the circuit board and the vibration generating device, and a second adhesive member between the vibration generating device and the display panel, an elastic modulus of the second adhesive member differing from an elastic modulus of the first adhesive member.

For example, in a display apparatus according to an embodiment of the present disclosure, the elastic modulus of the first adhesive member may be greater than the elastic modulus of the second adhesive member.

For example, in a display apparatus according to an embodiment of the present disclosure, the first adhesive member may include a material having conductivity.

For example, in a display apparatus according to an embodiment of the present disclosure, a size of the circuit board may be the same as a size of the vibration generating device.

For example, in a display apparatus according to an embodiment of the present disclosure, the circuit board may include a base film on the lower surface of the vibration generating device, a first electrode and a second electrode respectively on an upper surface and a lower surface of the base film, and a passivation layer on each of the upper surface and the lower surface of the base film.

For example, in a display apparatus according to an embodiment of the present disclosure, the base film may include a flexible printed circuit board including a polyimide.

For example, in a display apparatus according to an embodiment of the present disclosure, the display panel may include a first short side, a second short side facing the first short side, and a long side vertical to the first short side or the second short side, and a distance between a center of the vibration generating device and the first short side of the display panel may be ¼ to ⅓ of the long side of the display panel.

For example, a display apparatus according to an embodiment of the present disclosure may further include a second sound generating module on the rear surface of the display panel, the second sound generating module including a second vibration generating device.

For example, in a display apparatus according to an embodiment of the present disclosure, the display panel may include a first short side, a second short side facing the first short side, and a long side vertical to the first short side or the second short side, and a distance between a center of the vibration generating device and the second short side of the display panel may be ¼ to ⅓ of the long side of the display panel.

For example, in a display apparatus according to an embodiment of the present disclosure, the sound generating module may be symmetrical with the second sound generating module with respect to a center portion of the display module.

For example, in a display apparatus according to an embodiment of the present disclosure, the display panel may include a first short side, a second short side facing the first short side, a long side vertical to the first short side or the second short side, a first lengthwise direction and a second lengthwise direction dividing the first short side or the second short side into three equal portions, and a first widthwise direction and a second widthwise direction dividing the long side into three equal portions, the sound generating module may be in a region divided in the second lengthwise direction and the first widthwise direction or in a region divided in the first lengthwise direction and the first widthwise direction, and the second sound generating module may be in a region divided in the first lengthwise direction and the second widthwise direction or in a region divided in the second lengthwise direction and the second widthwise direction.

For example, in a display apparatus according to an embodiment of the present disclosure, each of the vibration generating device and the second vibration generating device may include a piezoelectric material layer.

For example, in a display apparatus according to an embodiment of the present disclosure may further include a partition disposed at a center portion of the rear surface of the display module.

For example, in a display apparatus according to an embodiment of the present disclosure, the display module may include a first rear region overlapping the sound generating module and a second rear region overlapping the second sound generating module, and the partition may be between the first rear region and the second rear region.

According to an embodiment of the present disclosure, a display apparatus includes a display module including a display panel configured to display an image and a sound generating module on a rear surface of the display panel, wherein the sound generating module includes a vibration generating device, a circuit board on a lower surface of the vibration generating device, a first adhesive member and a third adhesive member between the circuit board and the vibration generating device, and a member between the first adhesive member and the third adhesive member.

For example, in a display apparatus according to an embodiment of the present disclosure, a material of the first adhesive member may differ from a material of the third adhesive member.

For example, a display apparatus according to an embodiment of the present disclosure may further include at least one electrode on the lower surface of the vibration generating device, wherein the third adhesive member may be on the at least one electrode.

For example, in a display apparatus according to an embodiment of the present disclosure may further include a second adhesive member between the vibration generating device and the display panel.

For example, in a display apparatus according to an embodiment of the present disclosure, an elastic modulus of the second adhesive member may differ from an elastic modulus of the first adhesive member.

For example, in a display apparatus according to an embodiment of the present disclosure, a size of the circuit board may be the same as a size of the vibration generating device.

For example, in a display apparatus according to an embodiment of the present disclosure, the circuit board may include a base film on the lower surface of the vibration generating device, a first electrode and a second electrode respectively on an upper surface and a lower surface of the base film, and a passivation layer on each of the upper surface and the lower surface of the base film.

For example, in a display apparatus according to an embodiment of the present disclosure, each of the first electrode and the second electrode may be attached to the lower surface of the vibration generating device by the third adhesive member.

For example, in a display apparatus according to an embodiment of the present disclosure, the first adhesive member may be d between the passivation layer on the upper surface of the base film and the vibration generating device.

For example, a display apparatus according to an embodiment of the present disclosure may further include a fourth adhesive member disposed between the circuit board and the member.

For example, in a display apparatus according to an embodiment of the present disclosure, the display panel may include a first short side, a second short side facing the first short side, and a long side vertical to the first short side or the second short side, and a distance between a center of the vibration generating device and the first short side of the display panel may be ¼ to ⅓ of the long side of the display panel.

For example, a display apparatus according to an embodiment of the present disclosure may further include a second sound generating module on the rear surface of the display panel, the second sound generating module including a second vibration generating device.

For example, in a display apparatus according to an embodiment of the present disclosure, the display panel may include a first short side, a second short side facing the first short side, and a long side vertical to the first short side or the second short side, and a distance between a center of the vibration generating device and the second short side of the display panel may be ¼ to ⅓ of the long side of the display panel.

For example, in a display apparatus according to an embodiment of the present disclosure, the sound generating module may be symmetrical with the second sound generating module with respect to a center portion of the display module.

For example, in a display apparatus according to an embodiment of the present disclosure, the display panel may include a first short side, a second short side facing the first short side, a long side vertical to the first short side or the second short side, a first lengthwise direction and a second lengthwise direction dividing the first short side or the second short side into three equal portions, and a first widthwise direction and a second widthwise direction dividing the long side into three equal portions, the sound generating module may be in a region divided in the second lengthwise direction and the first widthwise direction or in a region divided in the first lengthwise direction and the first widthwise direction, and the second sound generating module may be in a region divided in the first lengthwise direction and the second widthwise direction or in a region divided in the second lengthwise direction and the second widthwise direction.

For example, a display apparatus according to an embodiment of the present disclosure may further include a partition disposed at a center portion of the rear surface of the display module.

For example, in a display apparatus according to an embodiment of the present disclosure, the display module may include a first rear region overlapping the sound generating module and a second rear region overlapping the second sound generating module, and the partition may be between the first rear region and the second rear region.

As described above, the display apparatus according to embodiments of the present disclosure may include the sound generating device which vibrates the display panel to generate a sound, and thus, may output the sound to a forward region in front of the display panel. Accordingly, an immersion experience of a viewer watching an image displayed by the display apparatus may be enhanced.

Moreover, since the display apparatus according to embodiments of the present disclosure includes the sound generating module including adhesive members having different elastic modulus, the durability of the sound generating module against a vibration or an external impact may be enhanced, and the durability of the sound generating module against attachment/detachment may be enhanced.

Moreover, since the display apparatus according to embodiments of the present disclosure includes the sound generating module including an adhesive member and a member which have different elastic modulus, the durability of the sound generating module against a vibration or an external impact may be enhanced, the durability of the sound generating module against attachment/detachment may be enhanced, and an adhesive surface between a circuit board and an adhesive member may be uniform, thereby reducing or preventing the defect of the circuit board.

It will be apparent to those skilled in the art that various modifications and variations may be made in the display apparatus of present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. An apparatus, comprising:

a display panel having a flexible substrate, an Organic Light Emitting Diode, and an encapsulation layer on the flexible substrate;

a touch electrode on the encapsulation layer; and a vibration generating device having a thin film layer on a rear surface of the flexible substrate and electrodes at the thin film layer, wherein the thin film layer comprises a piezoelectric material layer, wherein a first adhesive member is between the vibration generating device and a circuit board, wherein a second adhesive member is between the vibration generating device and the display panel, and wherein an elastic modulus of the first adhesive member is greater than an elastic modulus of the second adhesive member.

2. The apparatus of claim 1, further comprising a polarizing film on the touch electrode.

3. The apparatus of claim 2, wherein the polarizing film circularly polarizes external light reflected by the display panel.

4. The apparatus of claim 2, further comprising a touch panel provided between the display panel having the Organic Light Emitting Diode and the polarizing film, wherein the touch panel comprises a touch electrode layer having the touch electrode on the encapsulation layer.

5. The apparatus of claim 1, further comprising a cover window provided on an upper surface of the display panel.

6. The apparatus of claim 5, wherein the cover window has a width wider than that of a touch panel comprising the touch electrode.

7. The apparatus of claim 1, wherein the thin film layer comprises a piezoelectric material layer including at least one of Zinc Oxide (ZnO), Cadmium Sulfide (CdS), and Aluminum Nitride (AlN).

8. The apparatus of claim 1, wherein the vibration generating device is provided between a lower surface of the display panel and a circuit board applying a vibration driving signal to the vibration generating device.

9. The apparatus of claim 1, wherein the circuit board applies a vibration driving signal to the vibration generating device.

10. The apparatus of claim 1, wherein the vibration generating device is provided on a lower surface of the display panel, and a first electrode and a second electrode applying a vibration driving signal to the vibration generating device are provided on a lower surface of the vibration generating device.

11. The apparatus of claim 1, wherein a first electrode and a second electrode applying a vibration driving signal to the vibration generating device are provided on a lower surface of the vibration generating device, and a base film supporting the first electrode and the second electrode has the same size as that of the vibration generating device.

12. The apparatus of claim 1, wherein a first electrode and a second electrode applying a vibration driving signal to the vibration generating device are provided on a lower surface of the vibration generating device, and each of the first electrode and the second electrode has heat dissipation characteristic.

13. The apparatus of claim 1, wherein first and second electrodes applying a vibration driving signal to the vibration generating device are provided on a lower surface of the vibration generating device, a passivation layer is provided between a lower surface of the vibration generating device and the first and second electrodes, the passivation layer is provided in a region except the first and second electrodes.

14. An apparatus, comprising:

a display panel having a flexible substrate, an Organic Light Emitting Diode, and an encapsulation layer on the flexible substrate;

a touch electrode on the encapsulation layer; and a vibration generating device having a thin film layer on a rear surface of the flexible substrate, wherein a first and a second electrodes applying a vibration driving signal to the vibration generating device are provided on a lower surface of the vibration generating device, a passivation layer is provided between a lower surface of the vibration generating device and the first and second electrodes, the passivation layer is provided in a region except the first and second electrodes, a first adhesive member is provided between the lower surface of the vibration generating device and the first and second electrode, a second adhesive member is provided between the vibration generating device and the display panel, and a third adhesive member is provided between the lower surface of the vibration generating device and some of the passivation layer.

15. The apparatus of claim 14, wherein a member separating the first adhesive member and the third adhesive member is provided on the lower surface of the vibrating device.

16. The apparatus of claim 15, wherein a fourth adhesive member is provided between the member and a base film supporting the first and second electrodes.

* * * * *